US007950994B2

(12) United States Patent
Berman et al.

(10) Patent No.: US 7,950,994 B2
(45) Date of Patent: May 31, 2011

(54) REPLACEMENT REEL GAMING DEVICE AND METHOD

(75) Inventors: Bradley Berman, Minnetonka, MN (US); Ryan Strand, Hopkins, MN (US); Adam Martin, St. Louis Park, MN (US)

(73) Assignee: IGT, Reno, NV (US)

( * ) Notice: Subject to any disclaimer, the term of this patent is extended or adjusted under 35 U.S.C. 154(b) by 1436 days.

(21) Appl. No.: 11/224,732

(22) Filed: Sep. 12, 2005

(65) Prior Publication Data

US 2006/0058097 A1 Mar. 16, 2006

Related U.S. Application Data

(63) Continuation-in-part of application No. 10/939,122, filed on Sep. 10, 2004, now Pat. No. 7,396,279.

(60) Provisional application No. 60/609,133, filed on Sep. 10, 2004.

(51) Int. Cl.
*A63F 13/00* (2006.01)

(52) U.S. Cl. ........................................... 463/20; 463/16

(58) Field of Classification Search .................... 463/16, 463/20
See application file for complete search history.

(56) References Cited

U.S. PATENT DOCUMENTS

| | | | |
|---|---|---|---|
| 3,810,628 | A | 5/1974 | Vigan |
| 4,198,052 | A | 4/1980 | Gauselmann |
| 4,448,419 | A | 5/1984 | Telnaes |
| 4,624,459 | A | 11/1986 | Kaufman |
| 4,648,600 | A | 3/1987 | Olliges |
| 4,669,731 | A | 6/1987 | clarke |
| 4,695,053 | A | 9/1987 | Vazquez, Jr. et al. |
| 4,700,948 | A | 10/1987 | Okada |
| 4,838,552 | A | 6/1989 | Hagiwara |
| 4,991,848 | A | 2/1991 | Greenwood et al. |
| 5,152,529 | A | 10/1992 | Okada |
| 5,205,555 | A | 4/1993 | Hamano |
| 5,308,065 | A | 5/1994 | Bridgeman et al. |
| 5,332,228 | A | 7/1994 | Schultz |

(Continued)

FOREIGN PATENT DOCUMENTS

| | | |
|---|---|---|
| AU | 199717601 | 9/1997 |

(Continued)

OTHER PUBLICATIONS

Boot Scootin' Article, written by Strictly Slots, published in Apr. 2001.

(Continued)

*Primary Examiner* — James S. McClellan
*Assistant Examiner* — Damon J. Pierce
(74) *Attorney, Agent, or Firm* — K&L Gates LLP

(57) ABSTRACT

Apparatuses and methods for facilitating participation in a gaming activity. A reel configuration of a plurality of reels is presented, where each of the reels includes one or more associated gaming symbols. The presentation of the gaming symbols is modified on the plurality of reels, such as by spinning the reels or otherwise changing which symbols are presented on the reels. A replacement reel is presented, to supersede or otherwise supplant at least one of the gaming symbols of the reel configuration. Results of the gaming activity are established using the gaming symbols of the plurality of reels and the replacement reel. The result is thereby based on a resulting presentation of symbols that includes both the symbols of the primary reel configuration and the symbol(s) of the replacement reel(s).

38 Claims, 9 Drawing Sheets

U.S. PATENT DOCUMENTS

| | | | |
|---|---|---|---|
| 5,393,057 | A | 2/1995 | Marnell, II |
| 5,393,061 | A | 2/1995 | Manship et al. |
| 5,407,200 | A | 4/1995 | Zalabak |
| 5,423,539 | A | 6/1995 | Nagao |
| 5,449,173 | A | 9/1995 | Thomas et al. |
| 5,456,465 | A | 10/1995 | Durham |
| 5,560,603 | A | 10/1996 | Seelig et al. |
| 5,580,053 | A | 12/1996 | Crouch |
| 5,584,764 | A | 12/1996 | Inoue |
| 5,611,535 | A | 3/1997 | Tiberio |
| 5,711,525 | A | 1/1998 | Breeding |
| 5,722,891 | A | 3/1998 | Inoue |
| 5,769,716 | A | 6/1998 | Safari et al. |
| 5,772,506 | A | 6/1998 | Marks et al. |
| 5,779,544 | A | 7/1998 | Seelig et al. |
| 5,788,573 | A | 8/1998 | Baerlocher et al. |
| 5,807,172 | A | 9/1998 | Piechowiak |
| 5,823,874 | A | 10/1998 | Adams |
| 5,848,932 | A | 12/1998 | Adams |
| 5,851,148 | A | 12/1998 | Brune et al. |
| 5,855,514 | A | 1/1999 | Kamille |
| 5,882,261 | A | 3/1999 | Adams |
| 5,890,962 | A | 4/1999 | Takemoto |
| 5,911,418 | A | 6/1999 | Adams |
| 5,918,880 | A | 7/1999 | Voigt, IV et al. |
| 5,919,088 | A | 7/1999 | Weiss |
| 5,935,002 | A | 8/1999 | Falciglia |
| 5,947,820 | A | 9/1999 | Morro et al. |
| 5,964,463 | A | 10/1999 | Moore, Jr. |
| 5,971,849 | A | 10/1999 | Falciglia |
| 5,980,384 | A | 11/1999 | Barrie |
| 5,984,781 | A | 11/1999 | Sunaga |
| 5,984,782 | A | 11/1999 | Inoue |
| 5,988,638 | A | 11/1999 | Rodesch et al. |
| 6,003,867 | A | 12/1999 | Rodesch et al. |
| 6,004,207 | A | 12/1999 | Wilson, Jr. et al. |
| 6,012,982 | A | 1/2000 | Piechowiak et al. |
| 6,015,346 | A | 1/2000 | Bennett |
| 6,033,307 | A | 3/2000 | Vancura |
| 6,056,642 | A | 5/2000 | Bennett |
| 6,059,658 | A | 5/2000 | Mangano et al. |
| 6,062,980 | A | 5/2000 | Luciano |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,095,921 | A | 8/2000 | Walker et al. |
| 6,102,400 | A | 8/2000 | Scott et al. |
| 6,102,798 | A | 8/2000 | Bennett |
| 6,113,098 | A | 9/2000 | Adams |
| 6,120,377 | A | 9/2000 | McGinnis, Sr. et al. |
| 6,120,378 | A | 9/2000 | Moody et al. |
| 6,126,542 | A | 10/2000 | Fier |
| 6,142,873 | A | 11/2000 | Weiss et al. |
| 6,142,874 | A | 11/2000 | Kodachi et al. |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,165,070 | A | 12/2000 | Nolte et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,190,256 | B1 | 2/2001 | Walker et al. |
| 6,200,217 | B1 | 3/2001 | Osawa |
| 6,203,429 | B1 | 3/2001 | Demar et al. |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,227,971 | B1 | 5/2001 | Weiss |
| 6,231,442 | B1 | 5/2001 | Mayeroff |
| 6,231,445 | B1 | 5/2001 | Acres |
| 6,234,879 | B1 | 5/2001 | Hasegawa et al. |
| 6,234,897 | B1 | 5/2001 | Frohm et al. |
| 6,241,607 | B1 | 6/2001 | Payne et al. |
| 6,251,013 | B1 | 6/2001 | Bennett |
| 6,261,128 | B1 | 7/2001 | Heim et al. |
| 6,261,177 | B1 | 7/2001 | Bennett |
| 6,261,178 | B1 | 7/2001 | Bennett |
| 6,270,409 | B1 | 8/2001 | Shuster |
| 6,270,411 | B1 | 8/2001 | Gura et al. |
| 6,290,600 | B1 | 9/2001 | Glasson |
| 6,299,165 | B1 | 10/2001 | Nagano |
| 6,302,790 | B1 | 10/2001 | Brossard |
| 6,305,686 | B1 | 10/2001 | Perrie et al. |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,328,649 | B1 | 12/2001 | Randall et al. |
| 6,334,864 | B1 | 1/2002 | Amplatz et al. |
| 6,336,860 | B1 | 1/2002 | Webb |
| 6,340,158 | B2 | 1/2002 | Pierce et al. |
| 6,347,996 | B1 | 2/2002 | Gilmore et al. |
| 6,364,768 | B1 | 4/2002 | Acres et al. |
| 6,394,902 | B1 | 5/2002 | Glavich et al. |
| 6,398,644 | B1 | 6/2002 | Perrie et al. |
| 6,413,162 | B1 | 7/2002 | Baerlocher et al. |
| 6,419,579 | B1 | 7/2002 | Bennett |
| 6,439,993 | B1 | 8/2002 | O'Halloran |
| 6,443,452 | B1 | 9/2002 | Brune |
| 6,471,208 | B2 | 10/2002 | Yoseloff et al. |
| 6,481,713 | B2 | 11/2002 | Perrie et al. |
| 6,494,454 | B2 | 12/2002 | Adams |
| 6,517,432 | B1 | 2/2003 | Jaffe |
| 6,537,150 | B1 | 3/2003 | Luciano et al. |
| 6,537,152 | B2 | 3/2003 | Seelig et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,561,900 | B1 | 5/2003 | Baerlocher et al. |
| 6,561,904 | B2 | 5/2003 | Locke et al. |
| 6,565,433 | B1 | 5/2003 | Baerlocher et al. |
| 6,565,436 | B1 | 5/2003 | Baerlocher |
| 6,572,472 | B1 | 6/2003 | Glavich |
| 6,602,136 | B1 | 8/2003 | Baerlocher et al. |
| 6,604,740 | B1 | 8/2003 | Singer et al. |
| 6,604,999 | B2 | 8/2003 | Ainsworth |
| 6,605,002 | B2 | 8/2003 | Baerlocher |
| 6,616,142 | B2 | 9/2003 | Adams |
| 6,632,140 | B2 | 10/2003 | Berman et al. |
| 6,634,945 | B2 | 10/2003 | Glavich et al. |
| 6,638,165 | B2 | 10/2003 | Uchiyama et al. |
| 6,672,960 | B1 | 1/2004 | B-Jensen |
| 6,676,512 | B2 | 1/2004 | Fong et al. |
| 6,726,204 | B2 | 4/2004 | Inoue |
| 6,733,389 | B2 | 5/2004 | Webb et al. |
| 6,758,473 | B2 | 7/2004 | Seelig et al. |
| 6,780,109 | B2 | 8/2004 | Kaminkow |
| 6,880,826 | B2 | 4/2005 | Inoue |
| 6,910,962 | B2 | 6/2005 | Marks et al. |
| 6,960,133 | B1 | 11/2005 | Marks et al. |
| 7,001,274 | B2 | 2/2006 | Baerlocher et al. |
| 7,014,560 | B2 | 3/2006 | Glavich et al. |
| 7,040,987 | B2 | 5/2006 | Walker et al. |
| 7,070,502 | B1 | 7/2006 | Bussick et al. |
| 7,226,359 | B2 | 6/2007 | Bussick et al. |
| 2001/0009865 | A1 | 7/2001 | Demar et al. |
| 2003/0054874 | A1 | 3/2003 | Kaminkow |
| 2003/0057645 | A1 | 3/2003 | Baerlocher et al. |
| 2003/0060267 | A1 | 3/2003 | Glavich et al. |
| 2003/0153382 | A1 | 8/2003 | Vancura |
| 2003/0190947 | A1 | 10/2003 | Baerlocher et al. |
| 2003/0190948 | A1 | 10/2003 | Baerlocher et al. |
| 2003/0203752 | A1 | 10/2003 | Kaminkow et al. |
| 2003/0203753 | A1 | 10/2003 | Muir et al. |
| 2003/0216165 | A1 | 11/2003 | Singer et al. |
| 2003/0220134 | A1 | 11/2003 | Walker et al. |
| 2004/0012145 | A1 | 1/2004 | Inoue |
| 2004/0048646 | A1 | 3/2004 | Visocnik |

| | | | | |
|---|---|---|---|---|
| 2004/0048650 | A1 | 3/2004 | Minerau et al. | |
| 2004/0058722 | A1 | 3/2004 | Yang et al. | |
| 2004/0058727 | A1 | 3/2004 | Marks et al. | |
| 2004/0082378 | A1 | 4/2004 | Peterson et al. | |
| 2004/0192431 | A1 | 9/2004 | Singer et al. | |
| 2004/0195773 | A1 | 10/2004 | Masci et al. | |
| 2004/0242313 | A1 | 12/2004 | Munoz | |
| 2005/0009597 | A1 | 1/2005 | Daly | |
| 2005/0130737 | A1 * | 6/2005 | Englman et al. | 463/25 |
| 2006/0025210 | A1 | 2/2006 | Johnson | |
| 2006/0040728 | A1 | 2/2006 | Fuller | |

FOREIGN PATENT DOCUMENTS

| | | |
|---|---|---|
| AU | 722969 | 6/1998 |
| AU | 199917318 | 9/1999 |
| EP | 0 874 337 | 10/1998 |
| EP | 0 984 408 | 3/2000 |
| EP | 1 513 117 | 3/2005 |
| EP | 1 544 811 | 6/2005 |
| GB | 1 568 522 | 5/1980 |
| GB | 2 062 923 | 5/1981 |
| GB | 2 097 160 | 10/1982 |
| GB | 2 130 413 | 5/1984 |
| GB | 2 156 565 | 10/1985 |
| GB | 2 157 047 | 10/1985 |
| GB | 2 160 345 | 12/1985 |
| GB | 2 165 074 | 4/1986 |
| GB | 2 170 636 | 8/1986 |
| GB | 2 182 476 | 5/1987 |
| GB | 2 226 907 | 7/1990 |
| GB | 2 242 300 | 9/1991 |
| GB | 2 322 217 | 8/1998 |
| GB | 2 353 128 | 2/2001 |
| GB | 2 384 097 | 7/2003 |
| WO | WO 9732285 | 9/1997 |
| WO | WO 00/32286 | 6/2000 |
| WO | WO 00/66235 | 11/2000 |
| WO | WO 01/26019 | 4/2001 |
| WO | WO 2005/010831 | 2/2005 |
| WO | WO 2005/009560 | 3/2005 |

OTHER PUBLICATIONS

Break the Spell Brochure Advertisement, written by Atronic, published in 1999.

Break the Spell Atronic Game Description[online] [retrieved on Jan. 15, 2001]. Retrieved from the Internet at <URL: http://www.atronic.com/products/videoslots/breakthespell/content.shtml>.

Break the Spell Article, written by Strictly Slots, published in Sep. 2000.

Cash Chameleon Article, written by Strictly Slots, published in Apr. 2001.

Cossack Dancer Advertisement, written by Olympic Video Gaming, available prior to Sep. 12, 2005.

Description of Symbol Feature in Australian UFO Gaming Machine, written by Barcrest Ltd., published in 1995.

Double Diamond Run Advertisement, written by IGT, available prior to Sep. 12, 2005.

Enchanted Forest Gaming Description, written by Aristocrat, available prior to Sep. 12, 2005.

Enchanted Unicorn Advertisement, written by IGT, published in 2001.

Fishin' Buddies Article, published in Strictly Slots, published in Apr. 2001.

Happy Camper Advertisement, written by IGT, published in 2001.

Introducing the "Smiling Ape" Machine Advertisement (including Joker's Wild Poker description), written by IGT, available prior to Sep. 12, 2005.

Jackpot Party Brochure and Articles, written by WMS Gaming Inc., published in 1998.

Little Green Men, Jr. Advertisement, written by A.C. Coin and Slot Services Company, available prior to Sep. 12, 2005.

Loco Loot Article, written by Strictly Slots, published in May 2002.

Mountain Money Article, written by Strictly Slots, published in Jun. 2002.

Penguin Pays Advertisement, written by Aristocrat Incorporated, published in 1998.

Reel Magic Gaming Machine Description, written by IGT, available prior to Sep. 12, 2005.

The Classics Brochure, written by IGT, published May 4, 2004.

Wild Streak Advertisement, written by Strictly Slots, published in Mar. 2001.

* cited by examiner

REPLACEMENT REEL GAMING DEVICE AND METHOD

RELATED APPLICATIONS

This application claims the benefit of Provisional Patent Application Ser. No. 60/609,133, filed on Sep. 10, 2004, to which priority is claimed pursuant to 35 U.S.C. §119(e), and is a continuation-in-part of U.S. patent application Ser. No. 10/939,122, filed on Sep. 10, 2004, both of which are hereby incorporated by reference in their entireties.

FIELD OF THE INVENTION

This invention relates in general to gaming systems and processes, and more particularly to gaming systems and processes employing one or more superseding reels that replace one or more base game play reels and/or positions.

BACKGROUND OF THE INVENTION

Gaming devices such as slot machines have been in use in the U.S. for over a century. Notwithstanding the similarity of the symbols and reels associated with the slot machines of both today and yesteryear, modern day slot machine implementations are markedly different than their mechanical ancestors. This dramatic implementation disparity results primarily from the advent of computers and video capabilities. These additional capabilities provide for a greater range of implementation possibilities for the creative and innovative games devised by their creators. While a primary motivator for people to play gaming devices may be the chance to win monetary or other prizes (in the case of legalized gambling), the intrigue and excitement of playing these newly created machines plays a significant role in luring gaming participants to these gaming devices. It is therefore important in the gaming industry that gaming innovations be rolled out to the participating public.

Conventionally, participation in standard slot machines involves initiating rotation or "spinning" of multiple reels, and allowing the machine to randomly stop the reel rotation to reveal symbols on one or more paylines. If the symbols on that payline(s) correspond to a predetermined symbol combination, the participant wins an amount corresponding to the particular symbol combination. For multi-lined paylines, a coin or other token may be played for any one or more of the available paylines, and each of the paylines may provide a winning payout. A pay table may inform players of the winning symbol combinations for that machine, and what each symbol combination pays based on the number of coins allocated for the spin.

It is a continual effort in the gaming industry to develop ways to attract and captivate players in playing gaming machines, such as slot games. One such manner of stimulating interest and heightening excitement has been through the use of "bonus" events. Bonus events or other secondary gaming activities are used to attract players and maintain player interest at a gaming machine. A bonus game is typically an additional gaming activity that is enabled by a bonus-qualifying event from an underlying or primary gaming activity. Generally, a predetermined symbol, combination of symbols, or other predetermined event in an underlying or primary game may result in the player being awarded one or more bonus games. Often the bonus event has a much higher probability of winning, thereby instilling a great interest by players in being awarded bonus events.

Existing gaming activities employ special symbols, such as wild symbols or multipliers, to increase the excitement by providing the appearance of an increased chance of winning. Generally, wild symbols or other special symbols are provided as part of the physical or virtual (i.e. electronic/video) reel strip, and consequently simply represent another symbol on the reel strip. While this has appeal, it is limited in its ability to provide an element of suspense or anticipation.

The present invention addresses such shortcomings of the prior art, in either or both standard and bonus modes of play. The present invention provides gaming participants with an exciting, visually appealing manner of presenting auxiliary symbols in an otherwise fixed symbol set, and can be applied across a nearly limitless variety of gaming activities.

SUMMARY OF THE INVENTION

To overcome limitations in the prior art described above, and to overcome other limitations that will become apparent upon reading and understanding the present specification, the present invention discloses a gaming activity and a manner of providing and participating in such a gaming activity. Embodiments of the present invention provide a slot game event where a mechanical or video display grid with a number of grid positions is displayed to a game player, where one or more superseding reels replace base game grid positions.

In accordance with one embodiment of the invention, a method is provided for facilitating participation in a gaming activity. The method involves presenting a reel configuration of a plurality of reels, where each of the reels includes one or more associated gaming symbols. The presentation of the gaming symbols is modified on the plurality of reels, such as by spinning the reels or otherwise changing which symbols are presented on the reels. A replacement reel is presented, to supersede or otherwise supplant at least one of the gaming symbols of the reel configuration. Results of the gaming activity are established using the gaming symbols of the plurality of reels and the replacement reel. In this manner, the result is based on a resulting presentation of symbols that includes both the symbols of the primary reel configuration and the symbol(s) of the replacement reel.

In various embodiments, the replacement reel may include a single symbol, or may include multiple symbols whereby at least one of the replacement symbols of the replacement reel is presented to represent a current state of the replacement reel.

In one embodiment, the method further includes moving the replacement reel about at least a portion of the reel configuration, and stopping the movement of the replacement reel proximate at least one of the gaming symbols to establish its superseding position. Further, moving the replacement reel may include moving a visual depiction of the replacement reel as an overlay relative to the reel configuration. In other embodiments, presenting a reel configuration includes presenting a video reel configuration having multiple video reels, and presenting a replacement reel involves presenting a video replacement reel as an overlay relative to the video reel configuration.

In yet other embodiments, presenting a reel configuration may involve presenting a mechanical reel configuration having multiple mechanical reels. In such an embodiment, presenting a replacement reel to supersede a gaming symbol(s) involves presenting a video or mechanical replacement reel independent of the mechanical reel configuration, and distinguishing the gaming symbol(s) to be superseded by the video or mechanical replacement reel from remaining gaming symbols of the mechanical reel configuration.

Embodiments of such a method involve variations of replacement reel symbols. For example, the replacement reel may include gaming symbols of the same set of gaming symbols associated with the reels of the reel configuration. In such case, an optional implementation involves providing those same symbols on the replacement reel such that a statistical probability of presenting a particular gaming symbol on the replacement reel differs from a statistical probability of presenting the same particular gaming symbol on the reels of the reel configuration. In other embodiments, the replacement reel may include at least some, or all, gaming symbols different than the gaming symbols associated with the reels of the reel configuration. The replacement reel gaming symbols may include bonus symbols such as multipliers, and/or wild symbols, etc. In still other embodiments, a termination symbol(s) may be provided on the replacement reel, where presenting the superseding reel involves presenting the replacement reel for the gaming activity until presentation of the termination symbol(s).

Such a method may be implemented in a primary gaming event, and/or a bonus gaming event. Further, the replacement reel may ultimately present a single symbol, or may present multiple symbols across multiple paylines.

Further, each of these characteristics of the replacement reel may be equally applied to embodiments involving a plurality of such replacement reels.

In accordance with another embodiment of the invention, a gaming method is provided whereby a game is presented that includes primary grid elements (e.g., multiple locations where gaming symbols may be collectively or individually presented). A secondary grid element is provided that includes secondary game symbols, where the plurality of secondary game symbols include a stop symbol (which may include further stop symbols). The secondary grid element is associated with at least one of the primary grid elements. Game symbols in each of the primary grid elements are presented in at least those primary grid elements not associated with the secondary grid element. At least one secondary game symbol, randomly selected from the plurality of secondary game symbols, is presented in the secondary grid element. The game player is provided an award (which may be nothing) according to a pay table based on the game symbols in each of the primary grid elements not associated with the secondary grid element, in combination with the presented secondary game symbol. This may continue until a stop symbol is presented in the secondary grid element.

In accordance with more specific embodiments, such a method may further include repeatedly moving the association of the secondary grid element from its current associated primary grid element to a different primary grid element, such as between subsequent presentations of symbols and subsequent awardings. Other embodiments include that where the primary grid elements to not change between changes of the symbols of the replacement reel(s); i.e., the replacement reel(s) moves to different locations where results can be determined in connection with temporarily static primary grid elements.

In accordance with another embodiment of the invention, a gaming method involves at least defining a bonus event trigger; presenting a base game having a plurality of primary grid elements, and initiating a bonus event in response to an occurrence of the bonus event trigger. The method further includes providing one or more secondary grid elements, associating the secondary grid elements with one or more of the primary grid elements, presenting base game symbols in each of the primary grid elements, and presenting a randomly selected secondary game symbol in each of the secondary grid elements, where the randomly selected secondary game symbol is selected from at least one stop symbol and at least one additional symbol. The player is awarded according to a pay table based on the presented base game symbols in combination with the presented secondary game symbols. The bonus event is exited upon presentation of the stop symbol(s) presented in the secondary grid elements, and the player is returned to the base game.

In accordance with other embodiments of the invention, a gaming apparatus hosting a gaming activity, where the gaming apparatus includes a video or mechanical display grid including various primary grid elements which each include a plurality of primary game symbols, and at least one secondary grid element having a plurality of secondary game symbols. The apparatus further includes a processor configured to present the primary and secondary grid elements, present the secondary grid element(s) as a replacement element(s) to at least one of the primary grid elements, and to determine results of the gaming activity based on the primary game symbols in conjunction with one or more secondary game symbols of the replacement element(s).

BRIEF DESCRIPTION OF THE DRAWINGS

The invention is described in connection with the representative embodiments illustrated in the following diagrams.

DETAILED DESCRIPTION OF THE ILLUSTRATED EMBODIMENTS

Figure 1:
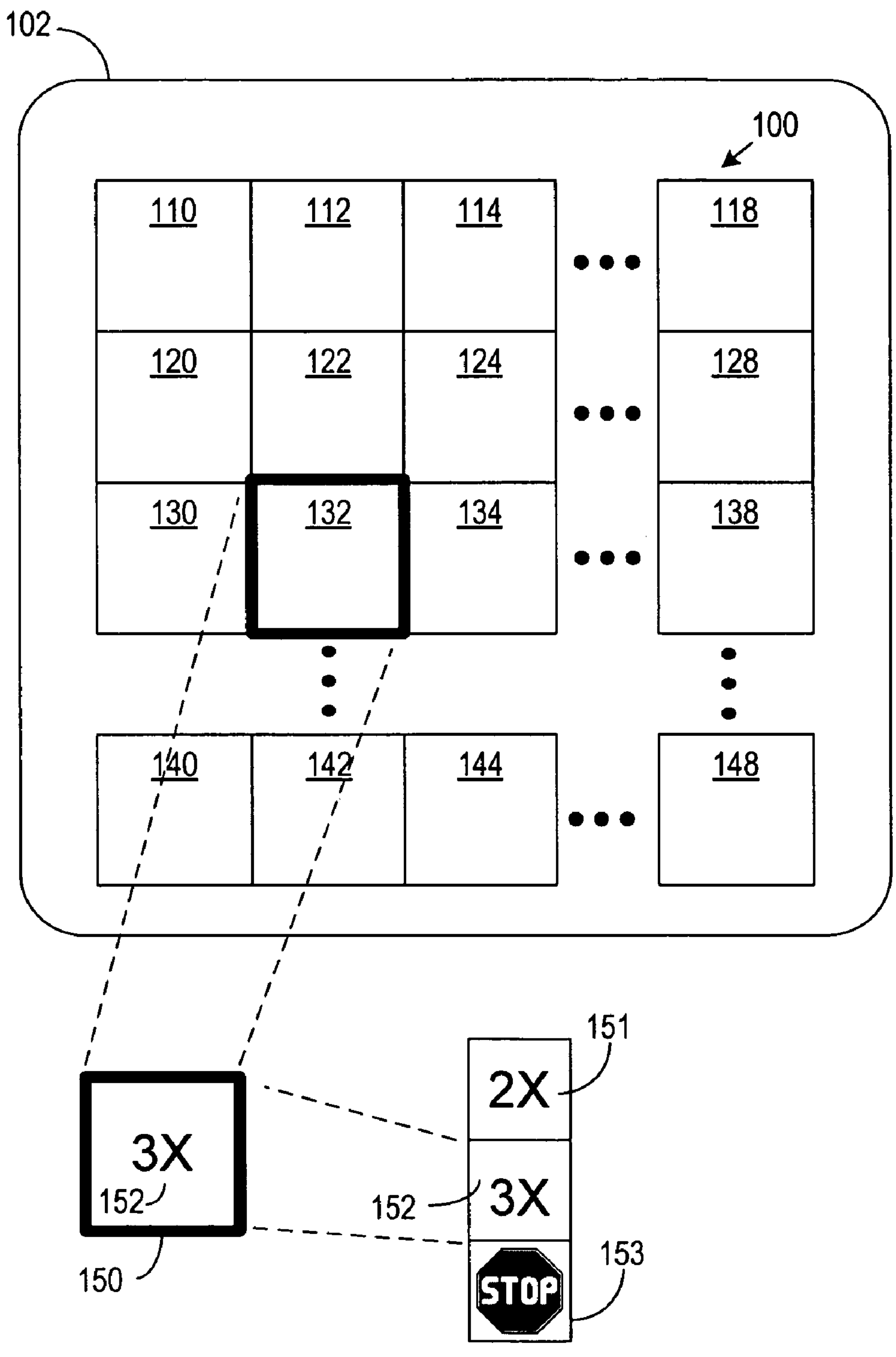
FIG. 1 is a representative example of a slot game grid that may be presented on a slot game display incorporating a replacement reel in accordance with the present invention.

This document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of the invention, reference is made to the accompanying drawings, which form a part hereof, and in which is shown by way of illustration the specific embodiment in which the invention may be practiced. It is to be understood that other embodiments may be utilized, as structural and operational changes may be made without departing from the scope of the present invention.

Generally, the present invention is directed to a method and apparatus for facilitating participation in a gaming activity, such as that played on a slot machine or other computing apparatus. For example, a slot game may include multiple "reels," where such reels may be in video (electronic) and/or mechanical (physical) form. Each reel includes one or more gaming symbols, and may present one, two, or more such symbols when the respective reel has stopped spinning or has otherwise changed from a previous state. In connection with the reels changing to this new state, a replacement reel(s) is presented. The replacement reel(s) includes multiple gaming symbols, which may have some, all, or no symbols in common with the symbols on the standard reels. The replacement reel in essence supersedes or otherwise replaces at least one of the gaming symbols of the standard reels. For example, the replacement reel may ultimately present a single symbol from its associated physical or virtual reel strip, or may ultimately present multiple symbols (e.g., the reel strip presenting three adjacent symbols). The presented symbol or symbols of the replacement reel thus takes the place of a corresponding number of symbols at some location of the standard reels. Results of the gaming activity are then determined using the gaming symbols of the standard reels and the replacement reel(s).

Other particular embodiments may involve utilizing the replacement reel for a particular time, such as until a termination symbol is presented on the replacement reel. For example, one embodiment involves presenting a primary display grid, including mechanical and/or electronic implementations, with a number of primary grid elements to a game player. One or more secondary grid elements having secondary game symbols, including at least one stop symbol, are associated with one or more of the primary grid elements. Game symbols are presented in each of the primary grid elements not associated with the one or more secondary grid elements. One secondary game symbol, randomly selected from the secondary game symbols, is presented in the secondary grid element. The game player is awarded according to the game symbols in each of the primary grid elements and the secondary game symbol. The gaming method and/or bonus game may be stopped in response to presentation of the stop symbol in the secondary grid element. Presenting the secondary game symbol may involve repetitively displaying each of the secondary game symbols in the secondary grid element prior to the random selection secondary game symbol finally displayed.

The present invention, as described more fully below, is applicable to a variety of gaming activities that are played on a gaming machine, including slot games such as reel slots and video slots, electronic poker and other electronic card games, keno, bingo, craps, dice, roulette, etc. The present invention is, however, described in large part in the present description in terms of slot machines to facilitate an understanding of the invention. While the invention is particularly advantageous in the context of slot machines, the invention is equally applicable to other gaming activities of chance as will be readily apparent to those of skill in the art from the description provided herein.

Further, the present invention may be provided in either a standard mode of play, and/or in connection with a bonus mode of play. More particularly, one embodiment in which the principles of the present invention are particularly beneficial includes at least one standard gaming activity, and at least one bonus activity. For example, in the context of slot machines, a standard gaming activity may include the normal slot game in which the participant places a wager, initiates spinning the mechanical or electronic/video slot game reels, and collects payouts upon the occurrence of one of a plurality of predetermined winning symbol combinations. A bonus activity is an activity that is often different from the standard gaming activity, and generally occurs only at certain times. In other words, where the standard gaming activity is the gaming activity that is presented to the participant automatically in connection with play of the gaming device, a bonus activity is not automatically presented to the participant. Rather, the bonus activity is generally a special occurrence awarded to the participant for an incident resulting from standard gaming play. For example, a bonus event may be awarded to a slot game participant if a resulting symbol combination occurring during standard slot game activity corresponds to a symbol combination determined in advance to result in a bonus event award. As is described more fully below, the present invention provides a gaming activity that may be used in connection with a primary gaming activity, and/or a secondary gaming activity such as a bonus event. Thus, while various embodiments of the present invention describe aspects of the invention in connection with a bonus event, those skilled in the art will readily appreciate from the description provided herein that the invention may be utilized in a standard mode of play (e.g., a primary gaming activity/ies), and/or one or more secondary gaming activities.

Figure 2:
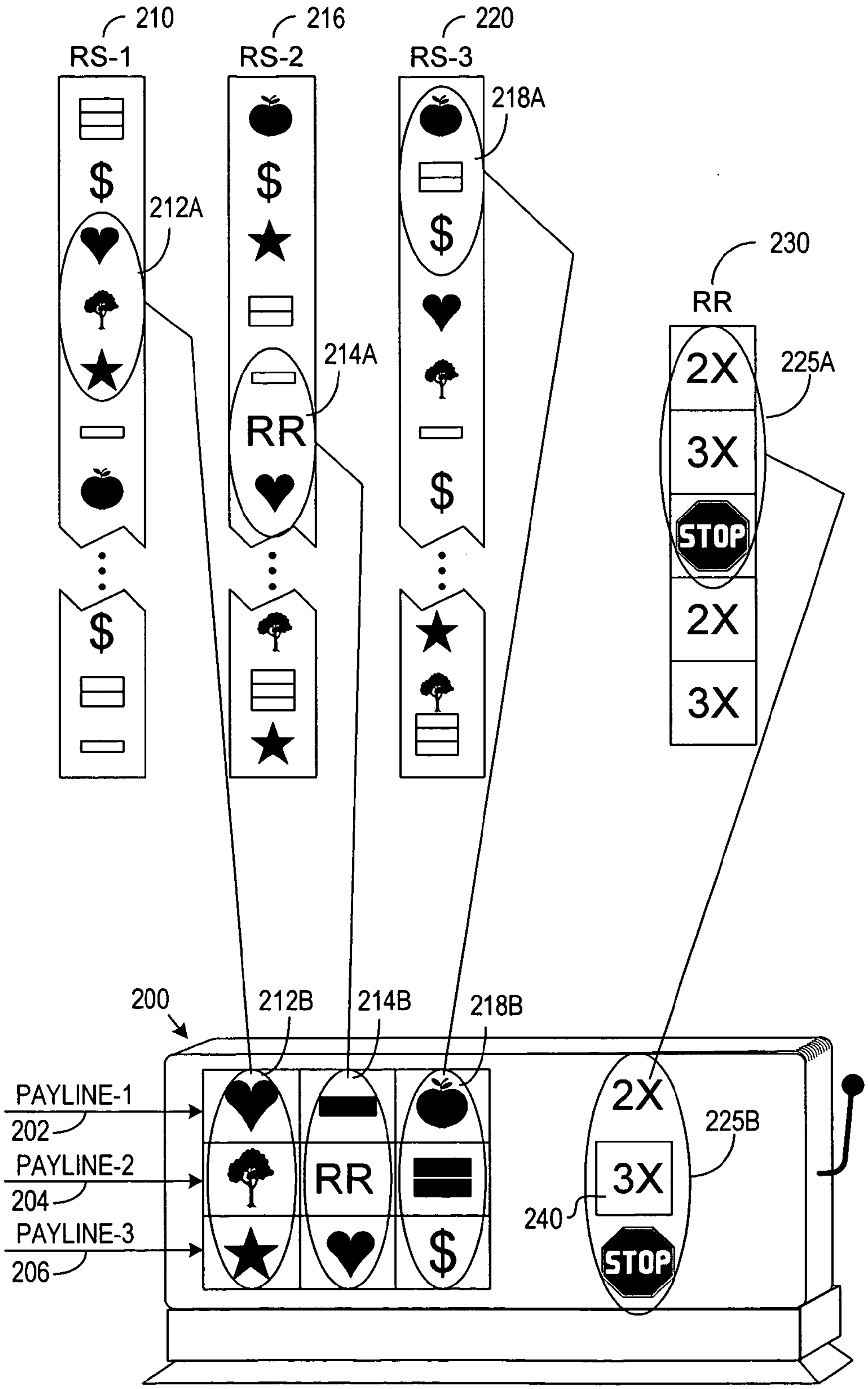
FIG. 2 is a block diagram illustrating one embodiment in which physical or virtual reel strips are associated with a slot game in accordance with embodiments of the invention.
Figure 3:
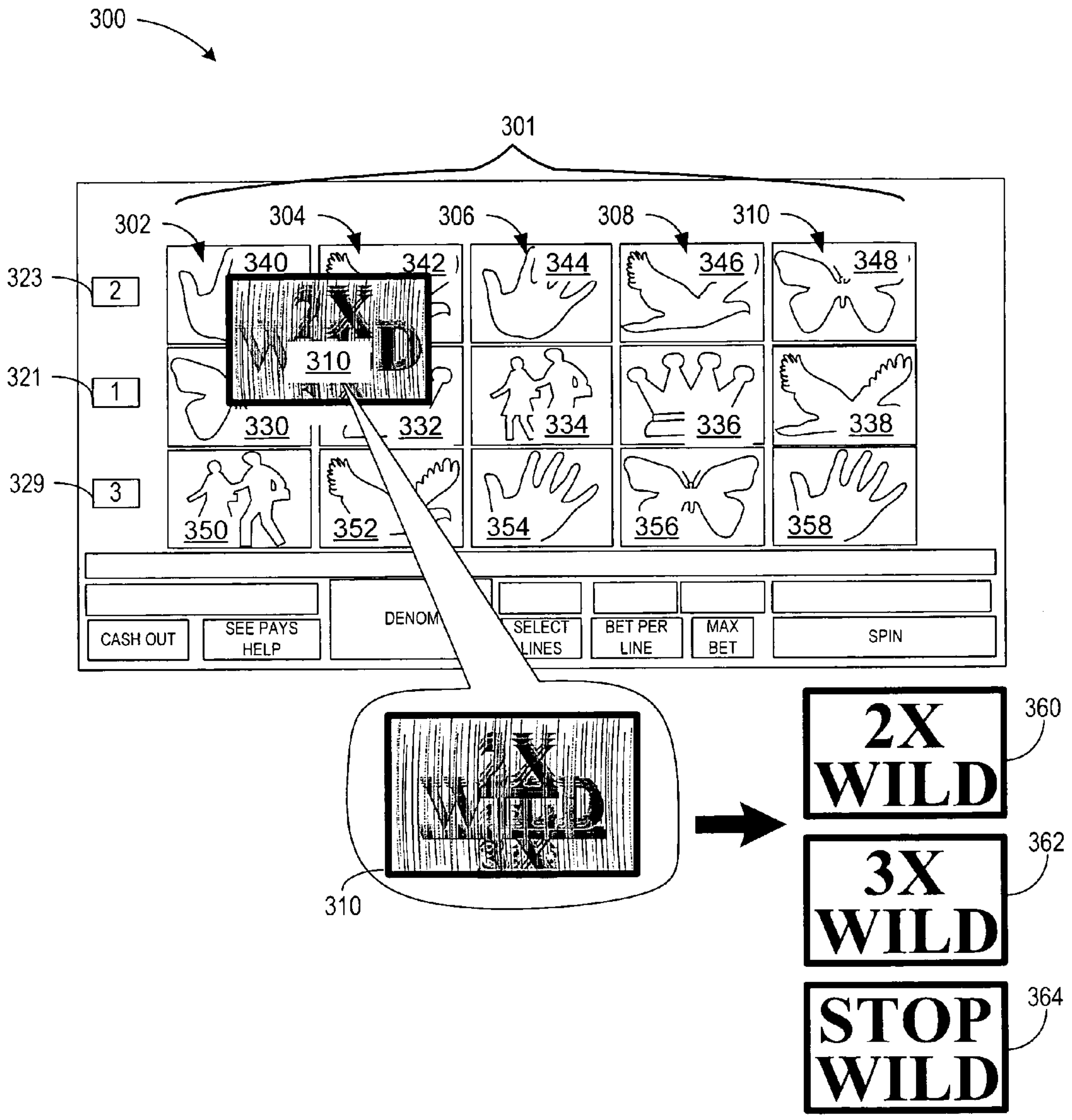
FIG. 3 illustrates a display screen employing roaming reels that replace base game play positions in accordance with embodiments of the present invention.

FIGS. 1-3 provide examples of gaming systems employing one or more replacement reels that replace base game play positions in accordance with embodiments of the invention. In order to provide an understanding of the operation of the invention, FIG. 1 illustrates a representative example of a slot game grid 100 that may be presented on a slot game display 102. The slot game grid 100 may be presented in video and/or mechanical form. When in video form, the display 102 may represent a display apparatus, such as a monitor or other electronic display device. In mechanical embodiments, the display 102 represents the visual aggregation of the mechanical reels.

Different slot games may exhibit a variety of different reel characteristics and display formats. For example, some slot games include a conventional three-reel configuration traditionally used in mechanical-reel slot machines. In a three-reel configuration, three reels each having an associated reel strip of symbols rotate vertically as viewed by the participant. The reels stop at random locations, thereby presenting the participant with one or more paylines of potentially winning symbol combinations, possibly depending on the amount wagered by the participant. In more recent times, this display formats have changed significantly, largely due to the ability to present electronic reels on a display screen. This has resulted in a variety of different reel formats, including greater quantities of vertically rotating electronic reels, greater numbers of paylines, and paylines that are vertical, diagonal, mixed, and/or the traditional horizontal paylines. The present invention is applicable with any reel configuration, including symmetric and asymmetric configurations of reels and/or grids. Therefore, the slot game grid 100 of FIG. 1 is shown as having an indeterminate number of rows and columns, which can accordingly represent an indeterminate number of reels, paylines, and the like. It should be recognized that the grid may be provided using electronic means such as video, and/or via mechanical means such as physical reels and associated reel strips.

The slot game grid 100 of FIG. 1 includes a number of rows, which may represent different paylines. However, rows do not necessarily correspond to paylines in accordance with the present invention, paylines may be any predetermined combination of display elements, and may include scatter pays or other paylines as known in the art. Each row includes one or more display elements. The first row illustrated in FIG. 1 includes display elements 110, 112, 114, through some number of display elements represented by display element 118. Similarly, a second row includes display elements 120, 122, 124 through 128, and a third row includes display elements 130, 132, 134 through 138. Depending on the number of display elements, rows, paylines, etc., additional rows may be provided through a final row depicted by display elements 140, 142, 144 through 148. Thus, FIG. 1 is intended to represent a generic slot game grid having any number or combination of display elements.

In accordance with an exemplary embodiment of the present invention, a predetermined pattern, number of symbols, or other predetermined symbol configuration will initiate a secondary mode of play, referred to herein as a bonus mode of play or bonus event. The bonus event can be initiated by a certain symbol combination arising on any of the paylines of the slot game grid 100, or by a certain predetermined symbol combination arising anywhere on the grid 100.

A secondary grid element 150 is associated with one of the primary grid elements. For example, in FIG. 1, the secondary grid element 150 is associated with the display element 132 of the slot game grid 100. The "association" may be indicated by overlaying the secondary grid element 150 over the display element 132 and obscuring it, by blanking or blacking out the display element 132, by outlining the display element 132 using lights, or using other identifying mechanisms.

The secondary grid element 150 has a secondary set of gaming symbols associated with secondary reel segments 151, 152, 153, etc. In the illustrated embodiment, the secondary set of gaming symbols includes a 2× (i.e. multiply by two) symbol 151, a 3× symbol 152, and a stop symbol 153. Any of these symbols may ultimately be presented in the secondary grid element 150. For example, these secondary reel segments 151, 152, 153 may be associated with a virtual or physical reel strip which can "spin" in secondary grid element 150. When the spinning stops, one of the symbols associated with the secondary reel segments 151, 152, 153 is presented in secondary grid element 150. In accordance with the present invention, this presented symbol (or symbols) in the secondary grid element 150 supersedes or otherwise supplants whatever symbol (or symbols) was presented in the slot game grid 100. For example, in the embodiment illustrated in FIG. 1, a presented symbol in the secondary grid element 150 supersedes the symbol otherwise presented at location 132.

In a video embodiment of the invention, the secondary grid element 150 is presented as a "floating" reel to the game player. In other words, secondary grid element 150 moves about the grid 100 which may occur, for example, during or after spinning of the reels of the primary grid 100. For example, the slot game grid 100 presents a set of symbols to the game player, and the secondary grid element 150 may continue to spin as it roams about the slot game grid 100. The secondary grid element 150 stops at a display element, such as the display element 132. After the roaming reel stops at the display element 132, a symbol is randomly selected from the secondary set of gaming symbols, such as the 3× symbol 152, and is presented to the game player. The player is than awarded based on the slot game grid 100 with the 3× symbol 152 at the display element 132. In one embodiment, such symbols may represent "wild" symbols and also exhibit a multiplier value such as 3× (multiplier of three). Thus, if the wild symbol now positioned at location 132 (i.e. superseding the symbol at location 132) results in a winning payline(s), the result is multiplied by three. On the other hand, if the 2× wild symbol 151 had been presented in the secondary grid element 150, the award(s) for the resulting payline(s) would be multiplied by two. In one embodiment, the secondary grid element 150 continues to roam about the grid for additional gaming activities until the secondary grid element 150 is terminated by way of presentation of a stop symbol, such as stop symbol 153. In an embodiment where the invention is implemented in the standard mode of play, there may be no such stop symbol.

After a replacement symbol (e.g., 151, 152, 153, etc.) has been used to supplant a slot game grid 100 symbol(s), the game may continue in several variations. For example, the slot game grid 100 may retain the existing symbols, and the roaming reel may start to spin again and move to another element of the slot game grid 100 for another payout. In other embodiments, all the reels may again spin, and the roaming reel may roam, or remain stationary. In other embodiments, the roaming reel may remain stationary with its current symbol, as the slot game grid 100 reels spin again. In further embodiments, the secondary grid element 150 spins as it roams, and repeatedly stops at display elements of the slot game grid 100 and awards winning outcomes until the secondary grid element 150 randomly selects the stop symbol 153.

In one embodiment of the invention, the standard mode of play may implement a first set of physical or electronic (e.g., virtual) reel strips, and the bonus mode of play may implement a different set of reel strips, where each reel strip provides a symbol set. Further, the standard mode of play may implement physical or virtual reel strips where multiple sequential symbols of the reel strip is provided on multiple paylines during the standard mode of play. For example, referring to FIG. 2, a slot machine 200 is shown in accordance with the present invention. In this example, the slot machine 200 includes three paylines, shown as a payline-1 202, a payline-2 204, and a payline-3 206. The reel strips associated with the slot machine 200 may be provided as physical strips having symbols imprinted thereon, such that the stopping point of the reel strip determines which symbols will fall on the paylines 202, 204, 206. For example, a first reel strip, RS-1 210 includes a series of symbols. This reel strip, when stopped, presents a group of symbols on the paylines 202, 204, 206. More particularly, the symbol group 212A is presented across payline-1 202, payline-2 204, and payline-3 206 as seen on the slot machine 200 as symbol group 212B. Analogously, the symbol group 214A of RS-2 216 is presented across paylines 202, 204, 206 as symbol group 214B on the slot machine 200; and the symbol group 218A of RS-3 220 is presented across paylines 202, 204, 206 as symbol group 218B on the slot machine 200. The same may hold true for virtual reel strips, where the order of the symbols on the virtual reel strip may be carried over to the order of the symbols presented across the paylines.

It should be noted that the particular reel strips, number of symbols, and type of symbols presented on the reel strips 210, 216, 220 may differ in various embodiments. For example, each of the reel strips can include a different symbol set altogether, rather than having symbols from a common symbol set such as illustrated in FIG. 2. Further, the symbols associated with any of the reel strips may change. For example, after each "spin" in the bonus mode one or more symbols or delineators may be changed, added, and/or removed in order to move wild symbols and/or other symbols as they roam in accordance with embodiments of the present invention.

In the example of FIG. 2, a predetermined symbol RR initiates the bonus activity. The symbol RR is shown on the payline 204 of the symbol group 214B. It should be noted that any predetermined symbol and/or combination of symbols may initiate the bonus activity, as well as any number of such symbols arising (e.g., one, two, etc.).

The roaming/floating reel feature may alternatively, or additionally, be integrated into a slot's base game rather than a bonus game. The floating reel could use a reel strip composed of symbols similar to all of the standard reels in the game but with higher or lower probabilities of being presented. For instance, the floating reel could use a reel strip that contains symbols corresponding to at least some of the symbols of the primary reel strips 210, 216, 220, but having a higher instance of symbols that can produce higher payout results. As another example, the floating reel 230 may include a higher number of wild symbols than in the base game, or may include all wild symbols. In another embodiment when used in the standard mode of play, the floating reel 230 may include a higher number of symbols used to trigger a bonus event. In other embodiments, some or all of the symbols in the floating reel 230 may be different than those in the primary game (e.g., all multipliers).

Further, roaming reel(s) may be delineated by indications external to the "reels." In other embodiments of the present invention, the reel strips 210, 216, 220 may continue to use the original symbols, and the roaming reel(s) may be associated with the reel strips 210, 216, 220 using, for example, lighting or other method of indicating positions to the player as the game progresses. For example, in a physical reel embodiment, such as is illustrated in FIG. 2, a reel strip 230, corresponding to a roaming reel (RR), may be provided by the slot machine 200. For ease of description, such a RR will be referred to herein as a "floating reel" or "roaming reel," which are used interchangeably herein. A symbol group 225A is presented across payline-1 202, payline-2 204, and payline-3 206 as seen on the slot machine 200 as a symbol group 225B. All three symbols of the symbol group 225B may be displayed on the slot machine 200, or fewer may be displayed. For example, only a display element 240 from the symbol group 225B may be visible to the player.

Assume for purposes of example the display element 240 presents a single symbol to the game player. The game player starts a game, and the reel strips 210, 216, 220 stop as indicated in FIG. 2, with the RR symbol on payline-2 204 of the symbol group 214B. The RR indicates to the player that the roaming reel strip 230 becomes active, and the reel 230 starts to spin, either independently or upon the next play by the game player. The reel 230 then stops and randomly selects a symbol, such as the 3× symbol displayed in the display element 240. The 3× symbol is presented at the display element 240, which in essence replaces the symbol at the payline-2 204 position of the base reel symbol group 214B, as indicated by the RR symbol. Paylines, scatter pays, or other pay methodologies may then be determined using the symbol provided by the display element 240 in combination with the base reel symbol group 214B. The reel 230 then starts to spin again, either independently or upon the next play by the game player, and repetitively stops, randomly selects a symbol, and provides winning payouts, until a stop symbol is selected by the reel 230, returning the player to the base mode of play.

In other embodiments, the roaming reel 230 may present multiple symbols when it stops spinning, such as two, three, or more symbols. For example, in one embodiment, the roaming reel 230 may stop spinning and present three symbols, such as the symbol group 225B, that replace the three adjacent base reel positions, such as the base reel symbol group 214B. Other embodiments include multiple roaming reels, having the same or different numbers of resulting symbols.

Referring now to FIG. 3, a video gaming embodiment in accordance with the present invention is presented. In this example, a video display screen 300 is provided. The video display screen may be implemented in a variety of manners, including electronically represented with outputs shown on conventional electronic displays, such as a liquid crystal displays (LCD), dot matrix, plasma, CRT, LED, electro-luminescent display, or generally any type of video display known in the art.

The display screen 300 of the embodiment illustrated in FIG. 3 includes a grid 301 including a plurality of video display elements. In the illustrated embodiment, the grid 301 includes five vertical virtual reels 302, 304, 306, 308, and 310 that rotate vertically. However, in a video display environment, the electronic reels need not rotate vertically, but may rotate horizontally along rows, or each display element may rotate independently of other display elements. In this example it is assumed that the electronic reels rotate vertically and in groups defined by reels 302, 304, 306, 308, and 310.

In the standard mode of play, the reels 302, 304, 306, 308, and 310 are electronically rotated. The reels are randomly stopped pursuant to operation of a random number generator (RNG) or other random operation engine. Winning symbol combinations may be presented along a number of different paylines. The example of FIG. 3 includes three paylines, shown as payline-1 321, payline-2 323, and payline-3 329. Additional paylines could be implemented such as along columns, diagonally, scatter pay, or any other predetermined pattern, particularly where the standard mode of play randomly selects symbols at each display element rather than providing a continuous reel strip for each column. In this example, payline-1 321 includes display elements 330, 332, 334, 336, and 338. Payline-2 323 includes display elements 340, 342, 344, 346, and 348. Payline-3 329 includes display elements 350, 352, 354, 356, and 358.

While the participant may win credits by obtaining predetermined symbol combinations along paylines 321, 323, 329, during the standard mode of play, the present invention also supports a bonus mode of play. Any predetermined symbol criteria may be used to invoke the bonus mode of play. For example, the criteria may be one or more predetermined symbols stopping at predetermined locations in the display element grid 301. An example is at least one predetermined symbol stopping in each of the reels 302, 304, 306, 308, and 310. Another exemplary criteria is a predetermined number of a predetermined symbol, regardless of where on the grid 301 these predetermined symbols present themselves. As will be readily apparent to those skilled in the art from the foregoing description, a wide variety of options may be implemented to invoke a bonus mode in accordance with embodiments of the invention.

For purposes of discussion, it is assumed that the present example implements a bonus mode, and that the criteria used to invoke the bonus mode is a predetermined symbol being presented in each of the reels 302, 304, 306, 308, and 310. In this embodiment of a roaming reel in accordance with the present invention, one or more floating reels 310 may be provided to serve as a manner of providing roaming wild symbols/positions. The floating reels 310 may be mechanical and/or electronic reels, and may include any desired symbols, which may or may not include "wild" symbols/positions.

For example, in an electronic embodiment, one or more video "reels" may be provided that roams about a symmetric or asymmetric grid. The roaming reel 310 spins (e.g., in a video embodiment presents an appearance of spinning), and roams to a particular grid location(s) where it stops. The roaming reel 310 may stop spinning, and present one or more symbols to supplant grid positions that would otherwise be provided via the base reels. Where the roaming reel 310 ultimately presents one symbol, one base reel position is then replaced by the roaming reel 310 symbol. In other embodiments, the roaming reel 310 may present multiple symbols when it stops spinning, such as two, three, or more symbols.

For example, in one embodiment, the roaming reel 310 may stop spinning and present two symbols that replace two adjacent base reel positions. Other embodiments include multiple roaming reels, having the same or different numbers of resulting symbols.

Assume for purposes of example the single roaming reel 310 presents a single symbol when the roaming reel 310 stops spinning. In such an embodiment, the roaming reel 310 moves (or has the appearance of moving) atop the base grid. When it stops moving along the grid, and when the roaming reel 310 stops spinning, a symbol is presented at a location which in essence replaces the symbol that would otherwise be presented at that location via the base reels. Paylines, scatter pays, or other pay methodologies may then be determined using the symbol provided by the roaming reel 310.

The symbols provided on the roaming reel 310 may be any desired symbols. For example, again assuming a single roaming reel 310, the roaming reel 310 may have two symbols that can ultimately be presented, such as a "Wild" symbol and a "Stop Wild" symbol. When the roaming reel 310 presents the "Wild" symbol, the location at which the roaming reel 310 stops becomes a wild location. When the roaming reel 310 presents the "Stop Wild" symbol, the roaming reel 310 may be discontinued.

Alternatively, a "Stop Wild" symbol may serve other or additional purposes, such as removing that particular location (where the roaming reel 310 stopped) thereafter "disabled" for further landings of the roaming reel 310. In such embodiment, the roaming reel 310 may continue roaming, and replacing base reels, until certain locations have been disabled, such as a predetermined number of grid locations, all grid locations, a pattern of grid locations (e.g., a payline of disabled grid locations), etc.

In another embodiment, additional symbols may be presented on the roaming reel 310 in addition to, or in lieu of, "Wild" or "Stop Wild" symbols. For example, one or more symbols that are also provided via the base reels may be included on the roaming reel 310. As a more particular example, the base reel(s) may involve certain symbols such as a plum symbol. The roaming reel 310 may include one or more plum symbols, and may additionally include other symbols including a wild symbol(s), termination symbol(s), other base reel symbol(s), and the like.

In one embodiment, the base reels spin at the same time that the roaming reel 310 spins. Thus, in this embodiment, the roaming reel 310 moves or "roams" about the grid while the base reels are spinning. The roaming reel 310 may stop spinning before, simultaneously, or after the spinning of the base reels.

In one embodiment, the base reels spin each time the roaming reel 310 is on the move. For example, the base reels may spin while the roaming reel 310 moves, the roaming reel 310 then stops on a location, the base reels stop spinning, and the roaming reel 310 stops spinning to provide a result. Then the base reels and roaming reel 310 start spinning again, the roaming reel 310 again stops on a location, the base reels stop spinning, and the roaming reel 310 stops spinning to provide a second result. This can continue until a terminating event occurs, such as a termination symbol on the 310, a time duration has elapsed, a random number of such roaming activities have occurred, a number/pattern of disabled grid locations have occurred, or any other predetermined condition occurs. The roaming reel embodiment may be used in a standard/primary gaming activity, and/or in a bonus activity(s).

The roaming reel 310 of FIG. 3 illustrates an embodiment where one symbol is presented when the roaming reel 310 stops spinning, although multiple floating reels may be used and multiple symbols may be presented when the floating reel(s) stop spinning. Further, the illustrated example provides a 15-line, 3×5 grid, but this could be applied to any grid layout and/or payline configuration.

The roaming reel 310 is an additional reel, independent of the game's base reels. In one embodiment it spins at the same time as the other reels, and in one embodiment uses a custom reel strip with special symbols, although this is not necessary. The roaming reel 310 can move left, right, up, down, or diagonally (i.e. adjacent) any number of spaces. In another embodiment, it may jump around to non-adjacent spaces in the grid. When the roaming reel 310 stops moving about the grid, and stops spinning, the symbol that appears in the roaming reel's window will cover a symbol(s) in the base game reels.

One exemplary application of the roaming reel 310 could be used to control a free spin bonus. For example, the floating reel's reel strip could be made up of the following symbols: a 2× Wild 360, a 3× Wild 362, and a Stop Wild 364. The free spin can continue until the Stop Wild 364 is presented. This example outlines only one representative free spin application of the roaming reel 310, although many other possibilities exist.

Figure 4A:
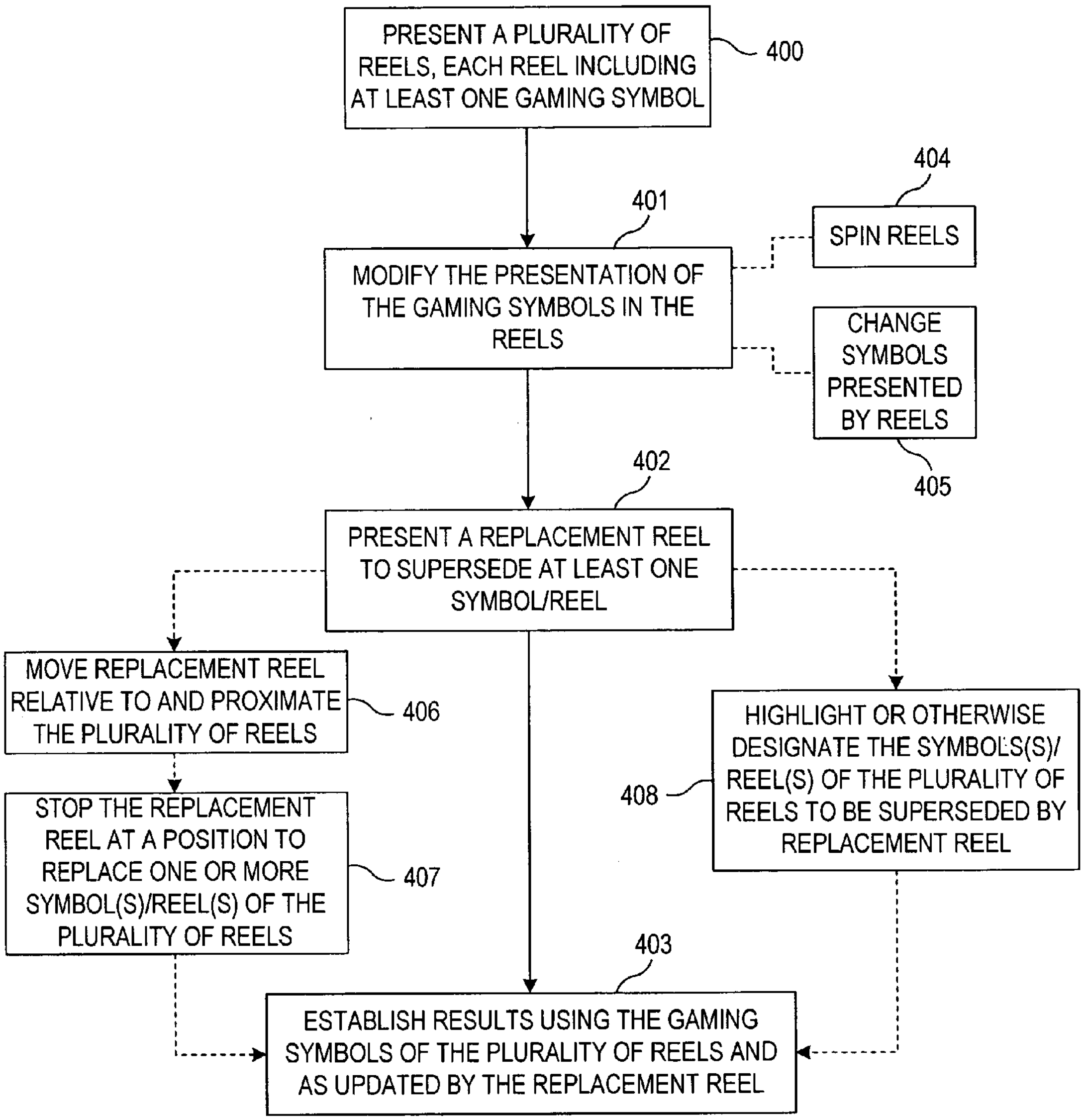
FIGS. 4A and 4B illustrate embodiments of gaming methods in accordance with the present invention.

FIG. 4A illustrates an exemplary method for facilitating participation in a gaming activity in accordance with the principles of the present invention. The method may be implemented in a primary (e.g., standard) and/or secondary (e.g., bonus) mode of activity. In the illustrated embodiment, a plurality of reels are presented 400 via a standard video or mechanical grid, where each reel includes at least one gaming symbol. The presentation of the symbols on those reels are modified 401 to present a new group of symbols from which payout awards can be determined. A replacement reel is presented 402 to supersede or otherwise displace one or more symbols/reels of the plurality of reels. It should be noted that while the depiction in FIG. 4A shows presenting 402 the replacement reel subsequent to modifying 401 the presentation of the symbols in the plurality of reels, this is merely a depiction and need not be the case. For example, the replacement reel may be presented 402 prior to, contemporaneously with, or subsequent to modification 401 of the symbols on the plurality of reels. Upon replacement of a symbol(s)/reel(s) by the replacement reel(s), results are established 403 using the gaming symbols of the plurality of reels and as updated by the replacement reel(s).

In one embodiment, modifying 401 the presentation of the gaming symbols on the reels includes, for example, spinning 404 and ultimately stopping the reels, or otherwise changing 405 the symbols presented by the reels. The plurality of reels may include either or both of electronic (e.g., video) and mechanical reels.

One embodiment for presenting the replacement reel is particularly beneficial in video implementations, where the replacement reel is moved 406 about the plurality of reels. For example, the replacement reel may be presented moved relative to and proximate the plurality of reels, such as an overlay relative to the plurality of reels to give the appearance that the replacement reel is floating or otherwise roaming atop the plurality of reels. In such an embodiment, the replacement reel may be stopped 407 at a position(s) to replace one or more symbols/reels of the plurality of reels. Another embodiment particularly suited for mechanical embodiments involves highlighting 408 or otherwise designating the symbol(s)/reel(s) of the plurality of reels to be superseded by the replacement reel. For example, one of the plurality of mechanical reels may be highlighted, and an independent replacement reel then takes the place of the highlighted reel.

One embodiment also involves associating multiple replacement symbols with the replacement reel (e.g., providing a multi-symbol virtual or physical reel strip for the replacement reel). In such an embodiment, at least one, and perhaps more of the replacement symbols are presented to supersede gaming symbols of the primary grid.

Embodiments also include providing gaming symbols for the replacement reel(s) that are of the same set of gaming symbols associated with the reels of the primary reel configuration (i.e., the plurality of reels). In such an embodiment, a statistical probability of presenting a particular gaming symbol on the replacement reel may differ from the statistical probability of presenting the same particular gaming symbol via the reels of the reel configuration. In another embodiment, the replacement reel may include at least some (which includes all) gaming symbols different than the gaming symbols associated with the reels of the reel configuration. Other embodiments involve providing bonus symbols on the replacement reel(s), such as multipliers, wild symbols, instant payouts, or any other predetermined award. These functions may also be aggregated on single symbols, such as a symbol that provides both a wild symbol and a multiplier value. In other embodiments, a termination or "stop" symbol may be provided, such that gaming activities utilizing the replacement reel continues until one or more occurrences of the stop symbol. In some embodiments, the replacement reel is used in connection with a standard mode of play, and in other embodiments the replacement reel is presented in connection with a bonus event and discontinued upon the occurrence of a predetermined event (e.g., a stop symbol, time duration, number of spins, and the like.

Figure 4B:
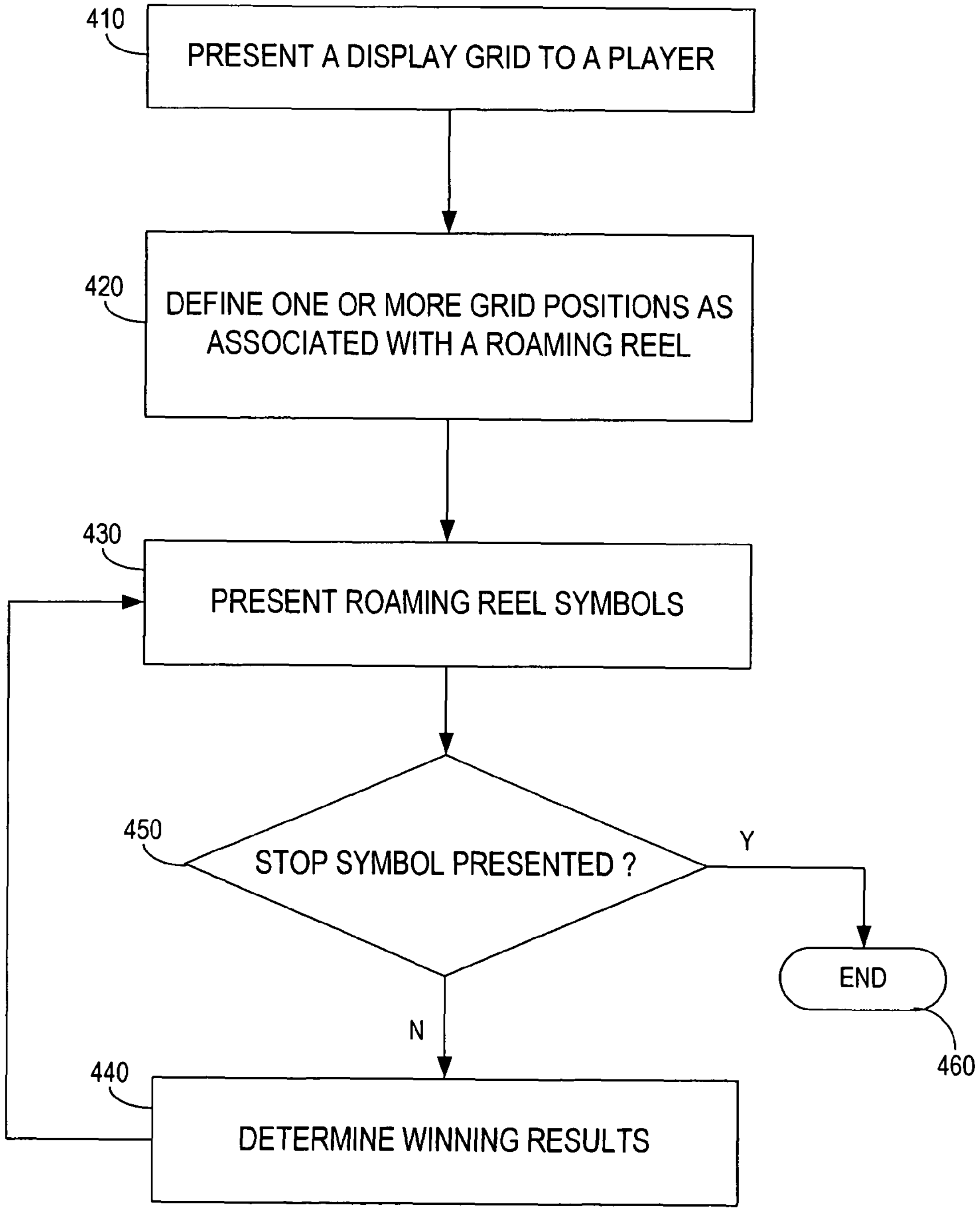

FIG. 4B illustrates a flow chart of a gaming method in accordance with embodiments of the present invention, which may be implemented in a system and/or machine as described above. The exemplary method involves presenting 410 a display grid to a game player. One or more grid positions 420 are defined as associated with a roaming reel. One or more symbols are presented 430 on the roaming reel. If a stop symbol 450 is not presented, winning results are determined 440 using the one or more roaming reel symbols to replace the symbols at the associated grid positions 420. One or more symbols are presented 430 again, until one or more stop symbols 450 cause an end 460 to the roaming reel event. It should be noted that a payout may also be associated with a stop symbol.

Figure 5:
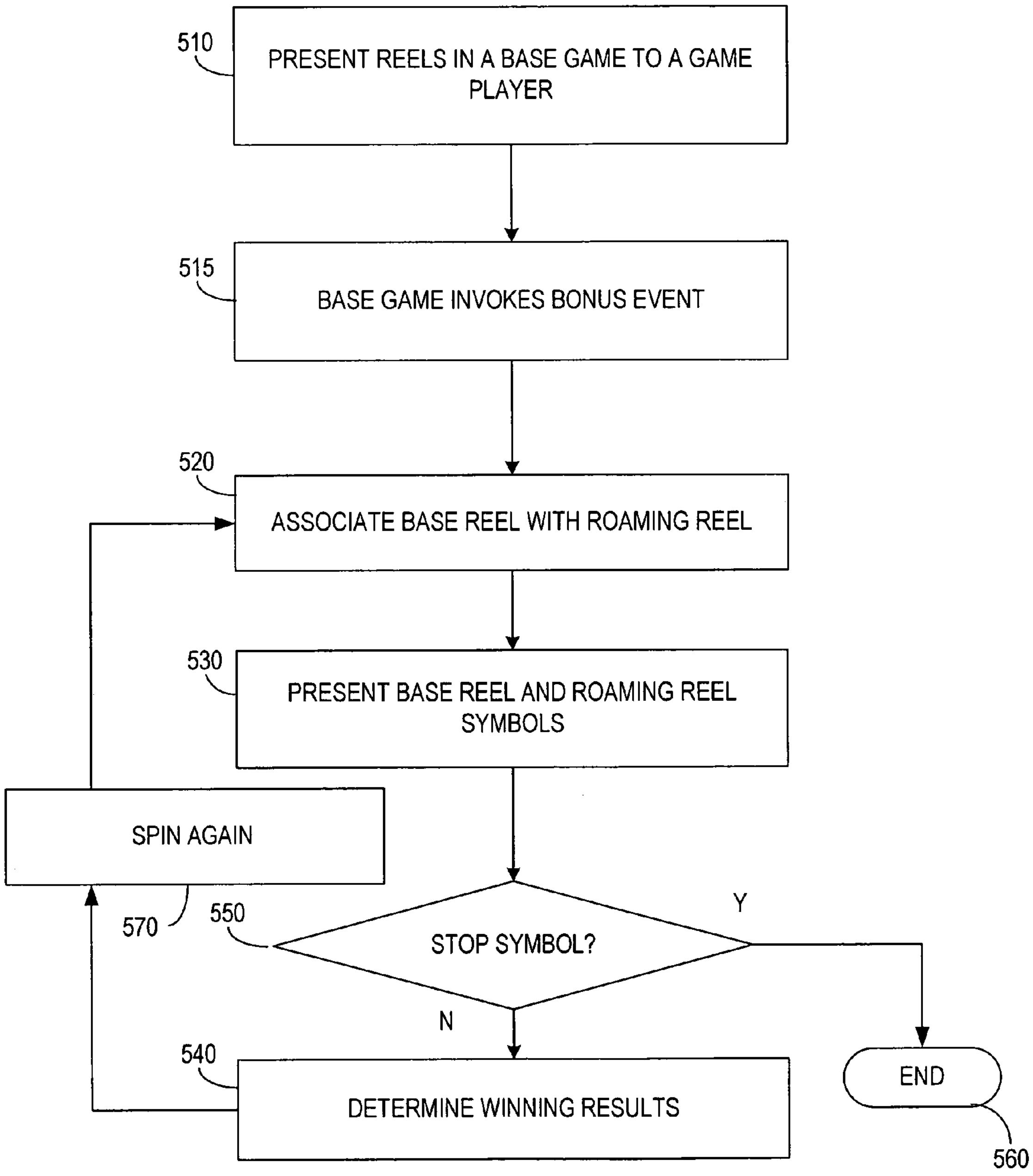
FIGS. 5 and 6 illustrate additional embodiments of gaming methodologies in accordance with the present invention.

FIG. 5 illustrates a flow chart of another embodiment of a gaming method in accordance with the present invention. The illustrated method involves presenting reels 510 in a primary/base game to a game player. The base game is played, and a combination of symbols invokes a bonus event 515. In the bonus event, one or more reels 510 are defined as associated with a roaming reel 520. One or more symbols are identified for presentation 530 on the roaming reel. If a stop symbol 550 is not presented 530, winning results are determined 540 using the roaming reel to replace the symbols at the associated base game reels. The bonus event continues, and the base reels and roaming reels are spun again 570. As the reels are spinning, the roaming reel may be re-defined to be associated with a different base reel. One or more symbols are again identified for presentation 530 on the base reels and roaming reel(s), until one or more stop symbols 550 cause an end 560 to the bonus event.

Figure 6:
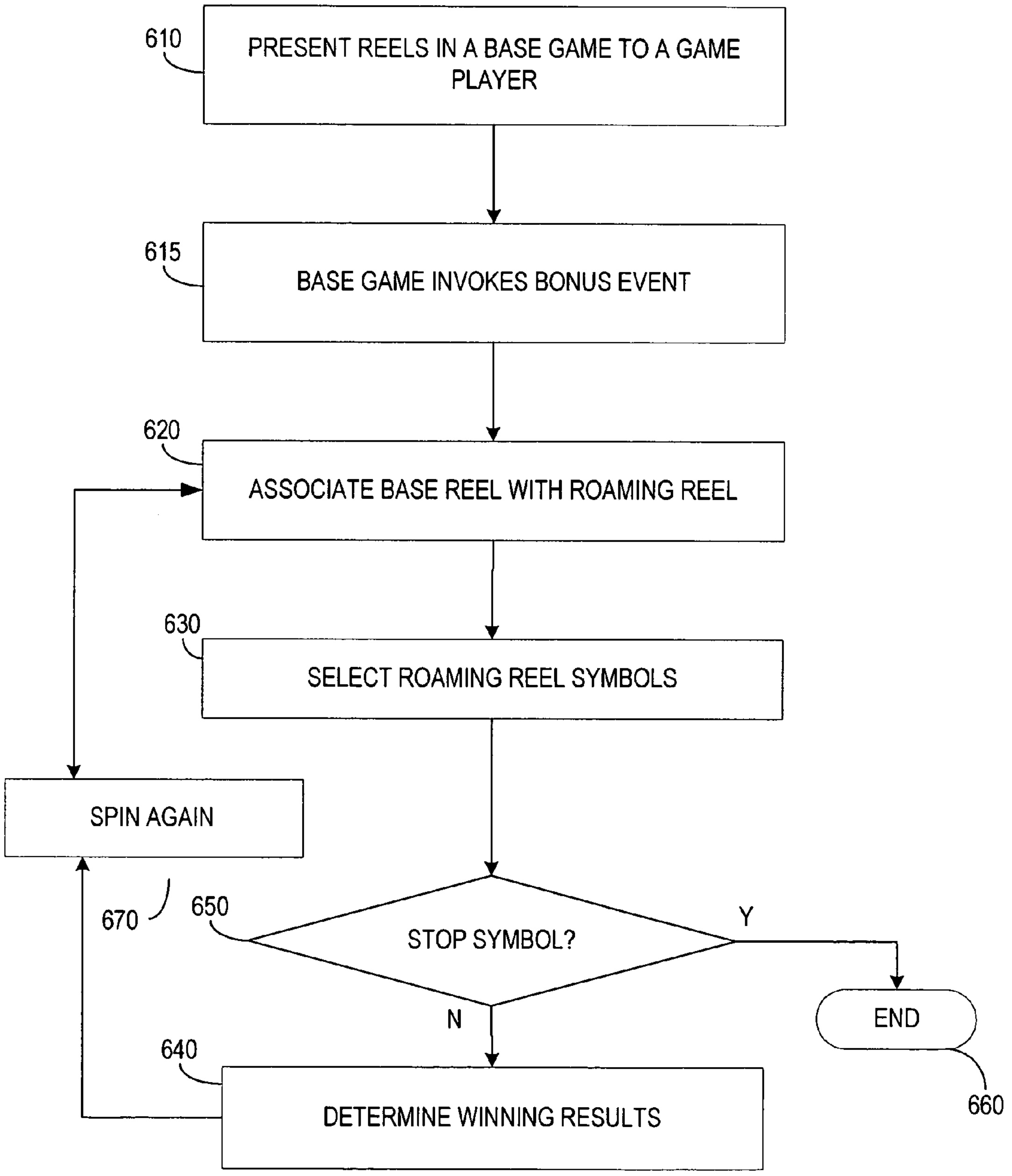

FIG. 6 illustrates a flow chart of another embodiment of a gaming method in accordance with embodiments of the present invention. The illustrated method involves presenting reels 610 in a base game to a game player. A base game is played, and a combination of symbols invokes a bonus event. In the bonus event, one or more reel elements 610 are defined as associated with a roaming reel 620. One or more symbols are presented 630 on the roaming reel. If a stop symbol 650 is not selected, winning results are determined 640 using the presented symbols 630 to replace the symbols at the associated base game reel elements 610. The bonus event continues, and the roaming reel is spun again 670. As the reel is spinning, the roaming reel is re-defined to be associated with a different base reel element. One or more symbols are presented 630 on the roaming reel, until one or more stop symbols 650 cause an end 660 to the roaming reel event.

Figure 7:
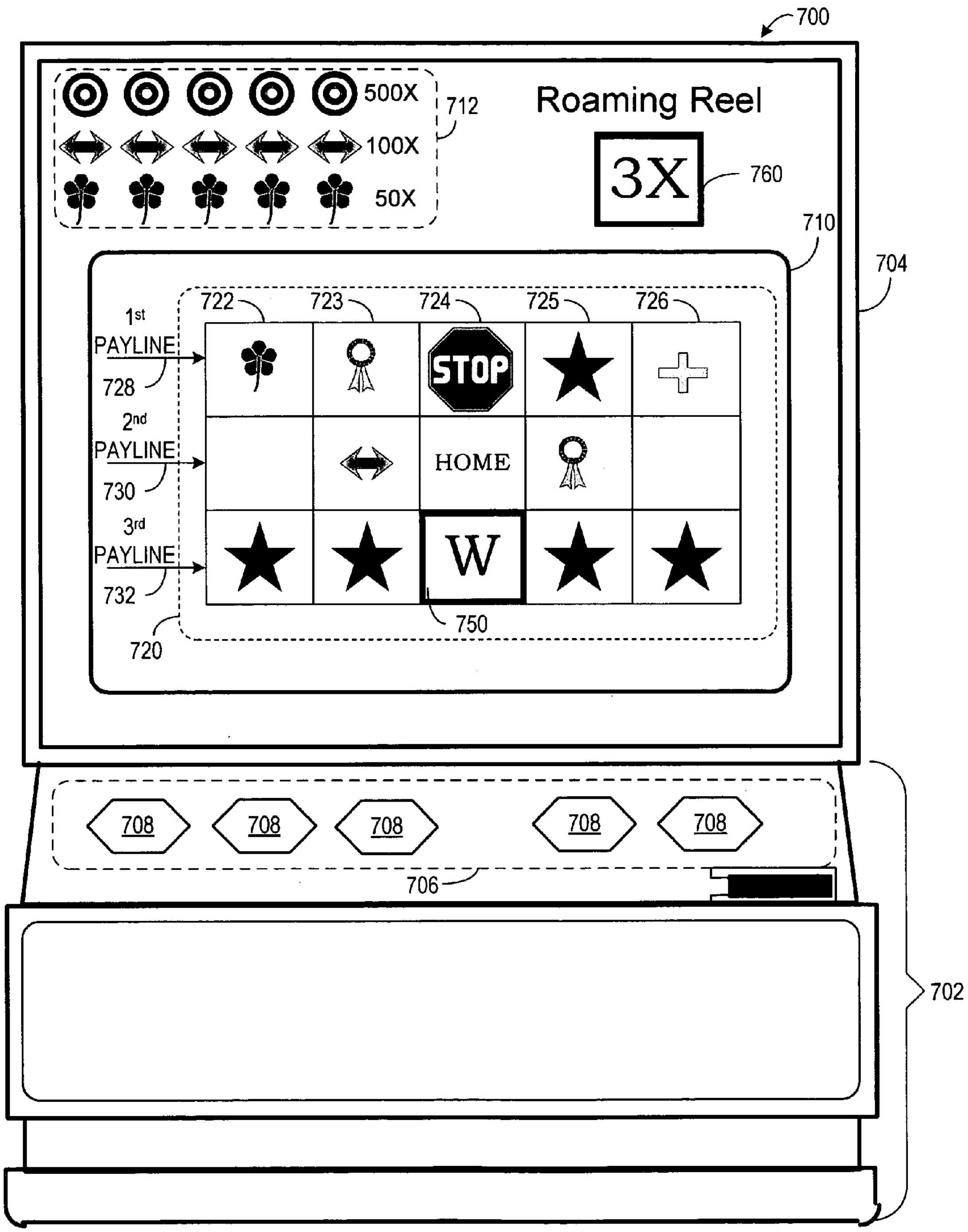
FIG. 7 is an embodiment of a casino-style gaming device in which the principles of the present invention may be applied.

FIG. 7 is an embodiment of a casino-style gaming device 700 in which the principles of the present invention may be applied. For purposes of explanation, the description of the gaming device 700 in FIG. 7 is provided in terms of a slot machine. However, the present invention is analogously applicable to other casino-style games. The slot machine 700 includes at least a computing/processing capability, a housing, and a display. The housing includes a base 702 and a display device 704 to allow the slot machine 700 to be a self-supported, independent structure. The base 702 includes structure supporting the slot machine 700, and also includes a user interface 706 to allow the user to control and engage in play of the slot machine 700. The particular user interface mechanisms associated with user interface 706 is dependent on the type of gaming machine. For example, the user interface 706 may include one or more buttons, switches, joysticks, levers, pull-down handles, trackballs, voice-activated input, or any other user input system or mechanism that allows the user to play the particular gaming activity.

The user input 706 allows the user to enter coins or otherwise obtain credits through vouchers, tokens, credit cards, etc. Various mechanisms for entering such vouchers, tokens, credit cards, coins, etc. are known in the art. For example, coin/token input mechanisms, card readers, credit card readers, smart card readers, punch card readers, and other mechanisms may be used to enter wagers. It is through the user input 706 that the user can initiate the standard mode of play, and may optionally control certain aspects of the bonus mode of play. Further, the user input may allow the user to control aspects such as when the roaming reel stops roaming, when the roaming reel stops spinning, etc.

In the case of a slot machine, the user input may include a plurality of buttons, e.g., button 708, which allow the user to enter a number of credits to play, identify the number of paylines in which to participate, cash out, automatically bet the maximum amount and paylines, etc. It should be recognized that a wide variety of other user interface options are available for use in connection with the present invention, including pressing a button on a gaming machine, touching a segment of a touch-screen, entering text, entering voice commands, or other known user entry methodology. The particular user interface mechanism employed is not relevant to the present invention.

The display device 704 includes a display screen 710. The display device may take on a variety of forms depending on what type of presentation is to be provided. For example, a slot game area 720 is provided where the standard slot gaming activity is displayed. In this example, the standard slot gaming activity includes five video reels 722, 723, 724, 725, and 726, and three paylines depicted as the $1^{st}$ payline 728, the $2^{nd}$ payline 730, and the $3^{rd}$ payline 732. The display elements occur at the intersections of each video reel and payline.

Also associated with the display device 704 is an optional payout guide or pay table area 712, where information associated with the potential winning symbol combinations of the standard slot game activity may be presented. This area may also provide an indication of the requisite symbols, symbol combinations, symbol locations, etc. that are required to invoke the bonus mode in accordance with embodiments of the invention. This information may be part of the display screen 710, or alternatively may be separate from the display screen 710 and provided directly on a portion of the display device 704 structure itself. For example, a backlit colored panel may be used as the winning guide area 712.

An indicator 750, such as an outline in this example, indicates that the W symbol indicated by the indicator 750 involves a roaming reel 760. The roaming reel 760, in this example, associates a 3× payout to the W symbol indicated by the indicator 750. Roaming reel base games as well as bonus events, such as described above, may be implemented in the slot machine 700 using the roaming reel 760. In a video embodiment, the roaming reel 760 may be visually presented over the reel 750 to be replaced.

Figure 8:
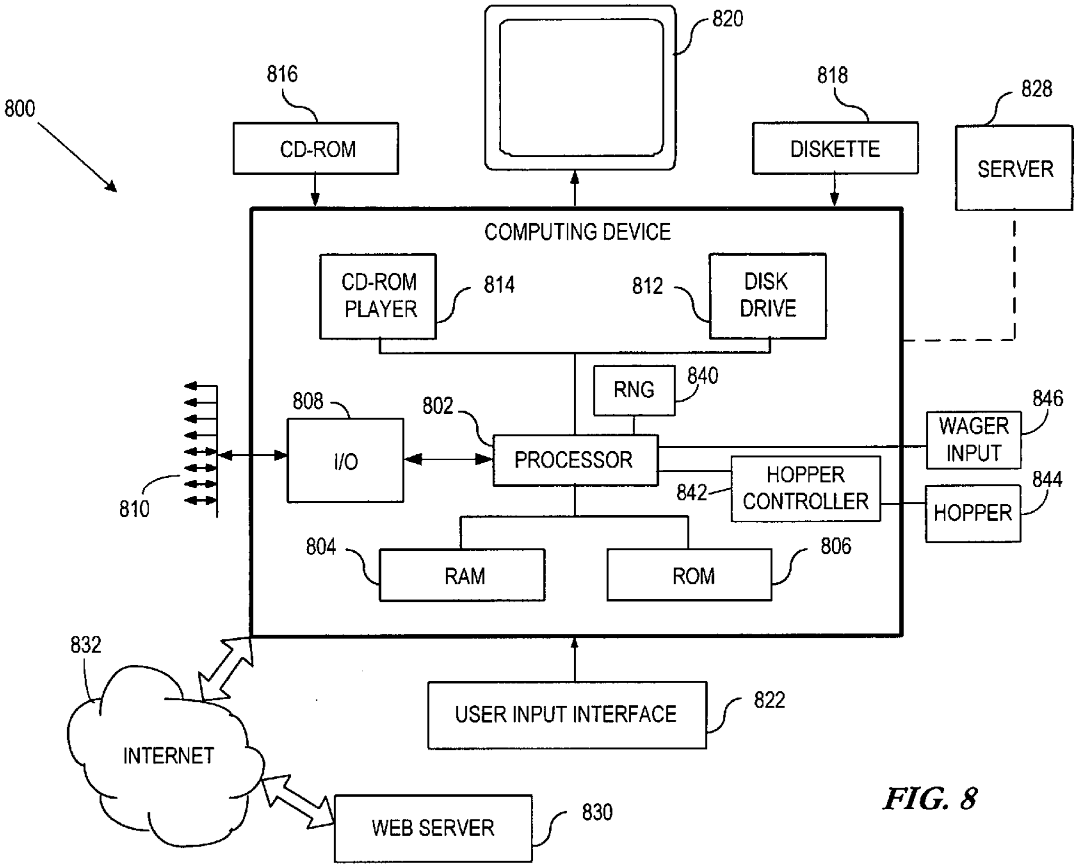
FIG. 8 is a block diagram of a representative computing system capable of carrying out operations in accordance with embodiments of the invention.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with embodiments of the invention is illustrated in FIG. 8.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 800 of FIG. 8 is an example computing structure that can be used in connection with such electronic gaming machines, computers, or other computer-implemented devices to carry out operations of the present invention.

The example computing arrangement 800 suitable for performing the gaming and bonus group functions in accordance with the present invention typically includes a central processor (CPU) 802 coupled to random access memory (RAM) 804 and some variation of read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals, communication signals, and the like.

Random numbers and processors govern chance-based gaming systems such as slot machines, in which the present invention is applicable. Electronic reels are used to display the result of the digital reels, which are actually stored in computer memory and "spun" by a random number generator (RNG). RNGs are well known in the art, and may be implemented using hardware, software operable in connection with the processor 802, or some combination of hardware and software.

In accordance with generally known technology in the field of slot machines, the processor 802 associated with the slot machine, under appropriate program instruction, can simulate the rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor were one-hundred and twenty-eight, the machine would have three remainders ranging from zero to one-hundred and twenty-seven. The remainders may be considered as stops on virtual reels. If the divisor was one-hundred twenty-eight, then the virtual reels would each have one-hundred twenty-eight stops with each stop being equally likely. Each stop on the virtual reel may be mapped to a stop on an actual reel or displayed reel image. These reel images may then be displayed on the display 820.

The present invention is operable using any known RNG, and may be integrally programmed as part of the processor 802 operation, or alternatively may be a separate RNG controller 840. RNGs are well known in the art, and any type of RNG may be implemented for the standard mode of play and/or the bonus mode of play in accordance with embodiments of the invention.

The computing arrangement 800 may also include one or more data storage devices, including hard and floppy disk drives 812, CD-ROM drives 814, and other hardware capable of reading and/or storing information such as DVD, etc. In one embodiment, software for carrying out the standard and bonus gaming operations in accordance with the present invention may be stored and distributed on a CD-ROM 816, diskette 818 or other form of media capable of portably storing information. These storage media may be inserted into, and read by, devices such as the CD-ROM drive 814, the disk drive 812, etc. The software may also be transmitted to the computing arrangement 800 via data signals, such as being downloaded electronically via a network, such as the Internet. Further, as previously described, the software for carrying out the functions associated with the present invention may alternatively be stored in internal memory/storage of the computing device 800, such as in the ROM 806.

The computing arrangement 800 is coupled to the display 820, which represents a display on which the gaming activities in accordance with embodiments of the invention are presented. The display 820 merely represents the "presentation" of the video information in accordance with embodiments of the invention, and may be any type of known display or presentation screen, such as LCD displays, plasma display, cathode ray tubes (CRT), etc. Where the computing device 800 represents a stand-alone or networked computer, the display 820 may represent a standard computer terminal or display capable of displaying multiple windows, frames, etc. Where the computing device is embedded within an electronic gaming machine, such as slot machine 700 of FIG. 7, the display 820 corresponds to the display screen 710 of FIG. 7. A user input interface 822 such as a mouse or keyboard may be provided where the computing device 800 is associated with a standard computer. An embodiment of a user input interface 822 is illustrated in connection with an electronic gaming machine 700 of FIG. 7 as the various "buttons" 708. Other user input interface devices include a keyboard, a mouse, a microphone, a touch pad, a touch screen, voice-recognition system, etc.

The computing arrangement 800 may be connected to other computing devices or gaming machines, such as via a network. The computing arrangement 800 may be connected to a network server 828 in an intranet or local network configuration. The computer may further be part of a larger network configuration as in a global area network (GAN)

such as the Internet. In such a case, the computer accesses one or more web servers 830 via the Internet 832.

Other components directed to slot machine implementations include manners of gaming participant payment, and gaming machine payout. For example, a slot machine including the computing arrangement 800 may also include a hopper controller 842 to determine the amount of payout to be provided to the participant. The hopper controller may be integrally implemented with the processor 802, or alternatively as a separate hopper controller 842. A hopper 844 may also be provided in slot machine embodiments, where the hopper serves as the mechanism holding the coins/tokens of the machine. The wager input module 846 represents any mechanism for accepting coins, tokens, coupons, bills, credit cards, smart cards, membership cards, etc. for which a participant inputs a wager amount.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "computer readable medium," "article of manufacture," "computer program product" or other similar language as used herein are intended to encompass a computer program which exists permanently, temporarily, or transitorily on any computer-usable medium such as on any memory device or in any transmitting device.

From the description provided herein, one skilled in the art will be able to combine the software created as described with appropriate general purpose or special purpose computer hardware to create a computer system and/or computer subcomponents embodying the invention, and to create a computing system and/or computer subcomponents for carrying out methods of the invention.

Many modifications and variations are possible in light of the above teaching. For example, the present invention is not limited to what is traditionally known as "slot machines." The present invention is applicable to any gaming device allowing participation in primary and/or secondary gaming activities. Also, while the illustrated embodiments have been described in large part in connection with a "slot machine," other gaming systems and concepts are also within the scope of the invention, such as video poker games, card games, lotteries, and other casino events implementing the appropriate display mechanism.

Further, in embodiments where the invention is implemented in a primary gaming activity or other standard mode of play, such embodiments may be configured to allow the participant to continually engage in such a repeated elimination slot game without entering a bonus mode. In such a case, it may be desirable to reduce the amount of the payouts, adjust the pay table, alter the probability of terminating a roaming reel, or otherwise adjusting the probability of winning to maintain desired odds of the gaming device.

As can be seen from the foregoing description, the exemplary embodiments of the invention described herein have been presented for the purposes of illustration and description, and many modifications and variations are possible in light of the above teaching. The description of these exemplary embodiments is not intended to be exhaustive or to limit the invention to the precise form disclosed. It is thus not intended that the scope of the invention be limited with this detailed description, but rather by the claims appended hereto.

What is claimed is:

1. A gaming device comprising:

a display device;

an input device;

a processor; and a memory device which stores a plurality of instructions, which when executed by the processor, cause the processor to operate with the display device and the input device to:

(a) receive an input made by a player, the received input corresponding to a wager placed by the player for a play of a game;

(b) display a plurality of reels, each of the reels including a plurality of different symbols;

(c) for each of the reels:

(i) randomly determine each of a predetermined quantity of the plurality of different symbols to be displayed on said reel, the predetermined quantity being at least one; and (ii) display each of the predetermined quantity of the randomly determined symbols on said reel;

(d) determine if any one of the displayed symbols corresponds to a predetermined trigger symbol; and (e) in response to any one of the displayed symbols corresponding to the predetermined trigger symbol and without any additional wager required from the player for the play of the game:

(i) display a replacement reel, the replacement reel including a plurality of different replacement symbols, the plurality of different replacement symbols including at least one terminator symbol;

(ii) associate the replacement reel with at least one of the displayed symbols on the reels;

(iii) randomly determine at least one of the different replacement symbols to be displayed on the replacement reel;

(iv) display the at least one randomly determined replacement symbol on the replacement reel; and (v) in response to the at least one displayed replacement symbol corresponding to any of the different replacement symbols other than the at least one terminator symbol:

(A) replace the at least one displayed symbol associated with the replacement reel with said at least one displayed replacement symbol;

(B) determine whether to provide one of a plurality of awards to the player, the determination based on the at least one displayed replacement symbol and at least one of the other displayed symbols, each of said other displayed symbols being on one of the other reels which has not been replaced;

(C) if the determination is to provide one of the awards, provide the award to the player; and (D) repeat (iii) to (v) until the at least one displayed replacement symbol corresponds to the at least one terminator symbol.

2. The gaming device of claim 1, wherein when executed by the processor, the plurality of instructions cause the processor, for each of a plurality of the displayed symbols, to determine if said displayed symbol corresponds to the designated trigger symbol.

3. The gaming device of claim 2, wherein when executed by the processor, the plurality of instructions cause the processor to:

(a) for each of the displayed symbols that corresponds to the predetermined trigger symbol:

(i) associate the replacement reel with said displayed symbol;

(ii) randomly determine at least one of the different replacement symbols to be displayed on the replacement reel;

(iii) display the at least one randomly determined replacement symbol on the replacement reel; and (iv) in response to the at least one displayed replacement symbol corresponding to any of the different replacement symbols other than the at least one terminator symbol:

(A) replace said displayed symbol associated with the replacement reel with the at least one displayed replacement symbol on the replacement reel;

(B) determine whether to provide one of the plurality of awards to the player, the determination based on the at least one displayed replacement symbol and at least one of the other displayed symbols that do not correspond to the predetermined trigger symbol, each of said other displayed symbols being on one of the other reels which has not been replaced;

(C) if the determination is to provide one of the awards, provide the award to the player; and (D) repeat (ii) to (iv) until the at least one displayed replacement symbol corresponds to the at least one terminator symbol.

4. The gaming device of claim 1, wherein when executed by the processor, the plurality of instructions cause the processor, for each of the displayed symbols, to: (a) determine if said displayed symbol corresponds to the predetermined trigger symbol, and (b) if said displayed symbol corresponds to the predetermined trigger symbol, replace said displayed symbol with one of the different replacement symbols displayed on the replacement reel.

5. The gaming device of claim 1, wherein when executed by the processor before causing the processor to execute the plurality of instructions to repeat (iii) to (v), the plurality of instructions cause the processor, for at least one of the displayed symbols on one of the reels that does not correspond to the predetermined trigger symbol, to:

(a) randomly determine at least one of the plurality of different symbols to be displayed on said reel; and (b) display the at least one randomly determined symbol on said reel.

6. The gaming device of claim 1, wherein when executed by the processor before causing the processor to execute the plurality of instructions to repeat (iii) to (v), the plurality of instructions cause the processor, for each of the displayed symbols on each of the reels that does not correspond to the predetermined trigger symbol, to:

(a) randomly determine one of the plurality of different symbols to be displayed on said reel; and (b) display the randomly determined symbol on said reel.

7. The gaming device of claim 1, wherein when executed by the processor, the plurality of instructions cause the processor to repeat (iii) to (v) in at least one subsequent play of the game.

8. The gaming device of claim 1, wherein when executed by the processor, the plurality of instructions cause the processor to repeat (iii) to (v) until the at least one displayed replacement symbol corresponds to the at least one terminator symbol, wherein each repetition occurs during a subsequent play of the game.

9. The gaming device of claim 1, wherein when executed by the processor, the plurality of instructions cause the processor to display a graphical representation of the replacement reel moving relative to the plurality of reels.

10. The gaming device of claim 9, wherein when executed by the processor, the plurality of instructions cause the processor to:

(a) display a graphical representation of the replacement reel moving between a first location, wherein the graphical representation of the replacement reel is separate from at least one of the plurality of reels, and a second location, wherein the graphical representation of the replacement reel is adjacent to one of the plurality of reels; and (b) in response to the graphical representation of the replacement reel being moved to the second location, associate the replacement reel with at least one of the symbols displayed on the reel adjacent to the graphical representation of the replacement reel.

11. The gaming device of claim 10, wherein when executed by the processor, the plurality of instructions cause the processor to replace the at least one displayed symbol associated with the replacement reel with the at least one displayed replacement symbol on the replacement reel.

12. The gaming device of claim 1, wherein when executed by the processor, the plurality of instructions cause the processor, for each of the plurality of reels, to randomly determine each of the predetermined quantity of the different symbols to be displayed on said reel, the random determination based on one of a plurality of different probabilities associated with each one of the different symbols of said reel.

13. The gaming device of claim 1, wherein when executed by the processor, the plurality of instructions cause the processor to randomly determine each of the different replacement symbols to be displayed on said replacement reel, the random determination based on one of a plurality of different probabilities associated with each one of the different replacement symbols.

14. The gaming device of claim 1, wherein for each of the reels, each of the different symbols of said reel is the same as one of the replacement symbols of the replacement reel.

15. The gaming device of claim 1, wherein for each of the reels, said reel includes a first one of the different symbols, the first symbol being the same for each of the reels.

16. The gaming device of claim 15, wherein the first symbol of each of the reels has a same probability as a first one of the replacement symbols of the replacement reel, and wherein the first replacement symbol is the same as the first symbol of each of the reels.

17. The gaming device of claim 15, wherein the first symbol of each of the reels has a different probability than a first one of the replacement symbols of the replacement reel, and wherein the first replacement symbol is the same as the first symbol of each of the reels.

18. The gaming device of claim 1, wherein for each of the reels, said reel includes at least one symbol which is different than at least one of the replacement symbols of the replacement reel.

19. The gaming device of claim 1, wherein for each of the reels, each of the different symbols of said reel is different than one of the replacement symbols of the replacement reel.

20. A method of operating a gaming device including a plurality of instructions, the method comprising:

(a) causing an input device to receive an input made by a player, the received input corresponding to a wager placed by the player for a play of a game;

(b) causing a display device to display a plurality of different reels, each of the different reels including a plurality of different symbols;

(c) for each of the different reels:

(i) causing a processor to execute the plurality of instructions to randomly determine each of a predetermined quantity of the different symbols to be displayed on said reel, the predetermined quantity being at least one; and (ii) causing the display device to display each of the randomly determined symbol on said reel;

(d) causing the processor to execute the plurality of instructions to determine if any one of the displayed symbols corresponds to a predetermined trigger symbol; and (e) in response to any one of the displayed symbols corresponding to the predetermined trigger symbol and without any additional wager required from the player for the play of the game:

(i) causing the display device to display a replacement reel, the replacement reel including a plurality of different replacement symbols, the plurality of different replacement symbols including at least one terminator symbol;

(ii) causing the processor to execute the plurality of instructions to associate the replacement reel with at least one of the displayed symbols on the reels;

(iii) causing the processor to execute the plurality of instructions to randomly determine at least one of the different replacement symbols to be displayed on the replacement reel;

(iv) causing the display device to display the at least one randomly determined replacement symbol on the replacement reel; and (v) in response to the at least one displayed replacement symbol corresponding to any of the different replacement symbols other than the at least one terminator symbol:

(A) causing the processor to execute the plurality of instructions to replace the at least one displayed symbol associated with the replacement reel with said at least one displayed replacement symbol on the replacement reel;

(B) causing the processor to execute the plurality of instructions to determine whether to provide one of a plurality of awards to the player, the determination based on the at least one displayed replacement symbol and at least one of the other displayed symbols, each of said other displayed symbols being on one of the other reels which has not been replaced;

(C) if the determination is to provide one of the awards, providing the award to the player; and (D) causing the processor to execute the plurality of instructions to repeat (iii) to (v) until the at least one displayed replacement symbol corresponds to the at least one terminator symbol.

21. The method of claim 20, which includes, for each of a plurality of the displayed symbols, causing the processor to execute the plurality of instructions to determine if said displayed symbol corresponds to the predetermined trigger symbol.

22. The method of claim 21, which includes:

(a) for each of the displayed symbols that corresponds to the predetermined trigger symbol:

(i) causing the processor to execute the plurality of instructions to associate the replacement reel with said displayed symbol;

(ii) causing the processor to execute the plurality of instructions to randomly determine at least one of the different replacement symbols to be displayed on the replacement reel;

(iii) causing the display device to display the at least one randomly determined replacement symbol on the replacement reel; and (iv) in response to the at least one displayed replacement symbol corresponding to any of the different replacement symbols other than the at least one terminator symbol:

(A) causing the processor to execute the plurality of instructions to replace said displayed symbol associated with the replacement reel with the at least one displayed replacement symbol on the replacement reel;

(B) causing the processor to execute the plurality of instructions to determine whether to provide one of the plurality of awards to the player, the determination based on the at least one displayed replacement symbol and at least one of the other displayed symbols that do not correspond to the predetermined trigger symbol, each of said other displayed symbols being on one of the other reels which has not been replaced;

(C) if the determination is to provide one of the awards, providing the award to the player; and (D) causing the processor to execute the plurality of instructions to repeat (ii) to (iv) until the at least one displayed replacement symbol corresponds to the at least one terminator symbol.

23. The method of claim 20, which includes, for each of the displayed symbols, causing the processor to execute the plurality of instructions to: (a) determine if said displayed symbol corresponds to the predetermined trigger symbol, and (b) if said displayed symbol corresponds to the predetermined trigger symbol, replace said displayed symbol with one of the different replacement symbols displayed on the replacement reel.

24. The method of claim 20, which includes, before causing the processor to execute the plurality of instructions to repeat (iii) to (v), for at least one of the displayed symbols on one of the reels that does not correspond to the predetermined trigger symbol:

(a) causing the processor to execute the plurality of instructions to randomly determine at least one of the different symbols to be displayed on said reel; and (b) causing the display device to display the at least one randomly determined symbol on said reel.

25. The method of claim 20, which includes, before causing the processor to execute the plurality of instructions to repeat (iii) to (v), for each of the displayed symbols on each of the reels that does not correspond to the predetermined trigger symbol:

(a) causing the processor to execute the plurality of instructions to randomly determine one of the plurality of different symbols to be displayed on said reel; and (b) causing the display device to display the randomly determined symbol on said reel.

26. The method of claim 20, which includes causing the processor to execute the plurality of instructions to repeat (iii) to (v) in at least one subsequent play of the game.

27. The method of claim 20, which includes causing the processor to execute the plurality of instructions to repeat (iii) to (v) until the at least one displayed replacement symbol corresponds to the at least one terminator symbol, wherein each repetition occurs during a subsequent play of the game.

28. The method of claim 20, which includes causing the display device to display a graphical representation of the replacement reel moving relative to the plurality of reels.

29. The method of claim 28, which includes:

(a) causing the display device to display a graphical representation of the replacement reel moving between a first location, wherein the graphical representation of the replacement reel is separate from at least one of the plurality of reels, and a second location, wherein the graphical representation of the replacement reel is adjacent to one of the plurality of reels; and (b) in response to the graphical representation of the replacement reel being moved to the second location, causing the processor to execute the plurality of instructions to associate the replacement reel with at least one of the symbols displayed on the reel adjacent to the graphical representation of the replacement reel.

30. The method of claim 29, which includes causing the processor to execute the plurality of instructions to replace the at least one displayed symbol associated with the replacement reel with the at least one displayed replacement symbol on the replacement reel.

31. The method of claim 20, which includes, for each of the plurality of reels, causing the processor to execute the plurality of instructions to randomly determine each of the predetermined quantity of the different symbols to be displayed on said reel, the random determination based on one of a plurality of different probabilities associated with each one of the different symbols of said reel.

32. The method of claim 20, which includes causing the processor to execute the plurality of instructions to randomly determine each of the different replacement symbols to be displayed on said replacement reel, the random determination based on one of a plurality of different probabilities associated with each one of the different replacement symbols.

33. The method of claim 20, wherein for each of the reels, each of the different symbols of said reel is the same as one of the replacement symbols of the replacement reel.

34. The method of claim 20, wherein for each of the reels, said reel includes a first one of the different symbols, the first symbol being the same for each of the reels.

35. The method of claim 34, wherein the first symbol of each of the reels has a same probability as a first one of the replacement symbols of the replacement reel, and wherein the first replacement symbol is the same as the first symbol of each of the reels.

36. The method of claim 34, wherein the first symbol of each of the reels has a different probability as a first one of the replacement symbols of the replacement reel, and wherein the first replacement symbol is the same as the first symbol of each of the reels.

37. The method of claim 20, wherein for each of the reels, said reel includes at least one symbol which is different than at least one of the replacement symbols of the replacement reel.

38. The method of claim 20, wherein for each of the reels, each of the different symbols of said reel is different than one of the replacement symbols of the replacement reel.

* * * * *

UNITED STATES PATENT AND TRADEMARK OFFICE

CERTIFICATE OF CORRECTION

PATENT NO. : 7,950,994 B2
APPLICATION NO. : 11/224732
DATED : May 31, 2011
INVENTOR(S) : Bradley Berman et al.

It is certified that error appears in the above-identified patent and that said Letters Patent is hereby corrected as shown below:

IN THE CLAIMS:

In Claim 20, column 21, line 8, replace “symbol” with -- symbols --.

Signed and Sealed this
Sixteenth Day of August, 2011

David J. Kappos
*Director of the United States Patent and Trademark Office*